(12) United States Patent
Goel et al.

(10) Patent No.: US 9,938,157 B2
(45) Date of Patent: Apr. 10, 2018

(54) INTERZEOLITE TRANSFORMATION AND METAL ENCAPSULATION IN THE ABSENCE OF AN SDA

(71) Applicants: Sarika Goel, Berkeley, CA (US); Stacey Ian Zones, San Francisco, CA (US); Enrique Iglesia, Moraga, CA (US)

(72) Inventors: Sarika Goel, Berkeley, CA (US); Stacey Ian Zones, San Francisco, CA (US); Enrique Iglesia, Moraga, CA (US)

(73) Assignees: Chevron U.S.A. Inc., San Ramon, CA (US); The Regents of the University of California, Oakland, CA (US)

( * ) Notice: Subject to any disclaimer, the term of this patent is extended or adjusted under 35 U.S.C. 154(b) by 346 days.

(21) Appl. No.: 14/708,833

(22) Filed: May 11, 2015

(65) Prior Publication Data
US 2016/0023913 A1    Jan. 28, 2016

Related U.S. Application Data

(60) Provisional application No. 62/028,255, filed on Jul. 23, 2014.

(51) Int. Cl.
| | | |
|---|---|---|
| *B01J 29/06* | (2006.01) | |
| *C01B 39/46* | (2006.01) | |
| *B01J 29/40* | (2006.01) | |
| *C01B 39/44* | (2006.01) | |
| *B01J 29/44* | (2006.01) | |
| *B01J 29/67* | (2006.01) | |
| *B01J 29/74* | (2006.01) | |
| *C01B 39/38* | (2006.01) | |
| *C01B 39/42* | (2006.01) | |
| *C01B 39/02* | (2006.01) | |
| *C01B 39/40* | (2006.01) | |
| *B01J 29/12* | (2006.01) | |
| *B01J 29/80* | (2006.01) | |
| *B01J 35/00* | (2006.01) | |

(52) U.S. Cl.
CPC ............ *C01B 39/46* (2013.01); *B01J 29/061* (2013.01); *B01J 29/126* (2013.01); *B01J 29/40* (2013.01); *B01J 29/44* (2013.01); *B01J 29/67* (2013.01); *B01J 29/74* (2013.01); *B01J 29/743* (2013.01); *B01J 29/80* (2013.01); *B01J 35/002* (2013.01); *C01B 39/026* (2013.01); *C01B 39/38* (2013.01); *C01B 39/40* (2013.01); *C01B 39/42* (2013.01); *C01B 39/44* (2013.01); *B01J 2229/18* (2013.01); *B01J 2229/186* (2013.01); *B01J 2229/40* (2013.01)

(58) Field of Classification Search
CPC . B01J 29/061; B01J 29/40; B01J 29/44; B01J 29/67; B01J 29/743; B01J 2229/186; B01J 2229/18; B01J 2229/40; C01B 39/026; C01B 39/38; C01B 39/42; C01B 39/44

USPC ................ 502/60, 74, 77, 85; 423/716, 709
See application file for complete search history.

(56) References Cited

U.S. PATENT DOCUMENTS

| | | | | |
|---|---|---|---|---|
| 4,444,898 | A * | 4/1984 | Schwartz | ............... B01J 29/061 502/62 |
| 5,276,249 | A * | 1/1994 | Greene | ............. B01D 53/8662 423/240 R |
| 2009/0048094 | A1* | 2/2009 | Ring | ...................... B01J 29/068 502/74 |
| 2012/0269719 | A1 | 10/2012 | Moden et al. | |
| 2014/0073499 | A1* | 3/2014 | Lee, IV | .................... C01B 3/40 502/74 |

FOREIGN PATENT DOCUMENTS

| | | |
|---|---|---|
| WO | 2010097108 | 9/2010 |
| WO | 2010/146156 A1 | 12/2010 |

OTHER PUBLICATIONS

Choi et al., "Mercaptosiland-Assisted Synthesis of Metal Clusters within Zeolites and Catalytic Consequences of Encapsulation", J. Am. Chem. Soc. 2010, 132, 9129-9137.*
Zenonos, Christianna, et al., "Direct hydrothermal conversion of high-silica faujausite and zeolite B to ZSM-5 and its catalytic performance", Catalysis Letters 86(4), pp. 279-283 (2003).
Wu, Zhijie, et al., "Hydrothermal synthesis of LTA-encapsulated metal clusters and consequences for catalyst stability, reactivity, and selectivity", Jr. Catalysis, vol. 311, pp. 458-468 (2014).
European Extended Search Report dated Mar. 30, 2017 in corresponding application EP 15824528.
S. Goel et al., "Synthesis and Catalytic Consequences of Metal and Oxide Clusters Encapsulated within Zeolites", University of California at Berkeley, 1 page, Jun. 5, 2013.
T. Sano et al., "High Potential of Interzeolite Conversion Method for Zeolite Synthesis", Journal of the Japan Petroleum Institute, 2013, vol. 56, No. 4, pp. 183-197.
R. Nedyalkova et al., "Interzeolite Conversion of FAU Type Zeolite into CHA and its Application in NH3-SCR", Top Catal, 2013, vol. 56, pp. 550-557.
A. Yashiki et al., "Hydrothermal conversion of FAU zeolite into LEV zeolite in the presence of non-calcined seed crystals", Journal of Crystal Growth, 2011, No. 325, pp. 96-100.

(Continued)

*Primary Examiner* — Elizabeth D Wood
(74) *Attorney, Agent, or Firm* — E. Joseph Gess; Melissa M. Hayworth; Terrence M. Flaherty

(57) ABSTRACT

Provided is a method of encapsulating a metal in a zeolite. The method comprises inserting a metal precursor into a parent zeolite, and then converting the parent zeolite to a zeolite having a higher framework density than the parent zeolite. The conversion is achieved without the need of an organic structure directing agent.

17 Claims, 8 Drawing Sheets

(56) References Cited

OTHER PUBLICATIONS

S. Goel et al., "Encapsulation of Metal Clusters within MFI via Interzeolite Transformations and Direct Hydrothermal Syntheses and Catalytic Consequences of Their Confinement", Journal of the American Chemical Society, 2014, vol. 136, pp. 15280-15290.

International Search Report corresponding to Application No. PCT/US2015/041579, dated Sep. 25, 2015.

M. D. Oleksiak et al., "Synthesis of zeolites in the absence of organic structure-directing agents: factors governing crystal selection and polymorphism", Rev. Chem. Eng., 2014, vol. 30, No. 1, pp. 1-49.

Mark E. Davis, "Ordered porous materials for emerging applications", Review Article, 2002, vol. 417, pp. 813-821.

M. Maldonado et al., "Controlling Crystal Polymorphism in Organic-Free Synthesis of Na-Zeolites", Journal of the American Chemical Society, 2013, vol. 135, pp. 2641-2652.

K. Itabashi et al., "A Working Hypothesis for Broadening Framework Types of Zeolites in Seed-Assisted Synthesis without Organic Structure-Directing Agent", Journal of the American Chemical Society, 2012, vol. 134, pp. 11542-11549.

P.-S. Lee et al., "Sub-40 nm Zeolite Suspensions via Disassembly of Three-Dimensionally Ordered Mesoporous-Imprinted Silicalite-1", Journal of the American Chemical Society, 2011, vol. 133, pp. 493-502.

S. I. Zones, "Conversion of Faujasites to High-silica Chabazite SSZ-13 in the Presence of N,N,N-Trimethyl-1-adamantammonium Iodide", Journal of the Chemical Society Faraday Trans., 1991, vol. 87, No. 22, pp. 3709-3716.

X. Meng et al., "Green Routes for Synthesis of Zeolites", Chemical Reviews, 2014, vol. 114, pp. 1521-1543.

C. S. Cundy et al., "The Hydrothermal Synthesis of Zeolites: History and Development from the Earliest Days to the Present Time", Chemical Review, 2003, vol. 103, pp. 663-701.

M. Moliner et al., "Synthesis Strategies for Preparing Useful Small Pore Zeolites and Zeotypes for Gas Separations and Catalysis", Chem. Mater., 2014, vol. 26, pp. 246-258.

B. Xie et al., "Organotemplate-Free and Fast Route for Synthesizing Beta Zeolite", Chem. Mater., 2008, vol. 20, No. 14, pp. 4533-4535.

H. Jon et al., "An Insight into the Process Involved in Hydrothermal Conversion of FAU to *BEA Zeolite", Chem. Mater., 2008, vol. 20, pp. 4135-4141.

K. Iyoki et al., "Broadening the Applicable Scope of Seed-Directed, Organic Structure-Directing Agent-Free Synthesis of Zeolite to Zincosilicate Components: A Case of VET-Type Zincosilicate Zeolites", Chem. Mater., 2014, vol. 26, pp. 1957-1966.

Mark E. Davis, "Zeolites from a Materials Chemistry Perspective", Chem. Mater., 2014, vol. 26, pp. 239-245.

Z. Wu et al., "Organic Template-Free Synthesis of ZSM-34 Zeolite from an Assistance of Zeolite L Seeds Solution", Chem. Mater., 2008, vol. 20, No. 2, pp. 357-359.

J. Dhainaut et al., "One-pot structural conversion of magadiite into MFI zeolite nanosheets using mononitrogen surfactants as structure and shape-directing agents", CrystEngComm, 2013, vol. 15, pp. 3009-3015.

L. V. Tendeloo et al., "Alkaline cations directing the transformation of FAU zeolites into five different framework types", Chem. Commun., 2013, vol. 49, pp. 11737-11739.

B. Xie et al., "Seed-directed synthesis of zeolites with enhanced performance in the absence of organic templates", Chem. Commun., 2011, vol. 47, pp. 3945-3947.

P. B. Weisz et al., "Catalysis by Crystalline Aluminosilicates II. Molecular-Shape Selective Reactions", Journal of Catalysis, 1962, vol. 1, pp. 307-312.

A. Corma et al., "Issues in the Synthesis of Crystalline Molecular Sieves: Towards the Crystallization of Low Framework-Density Structures", Chem. Phys. Chem., 2004, vol. 5, pp. 304-313.

Y. Kamimura et al., "OSDA-free synthesis of MTW-type zeolite from sodium aluminosilicate gels with zeolite beta seeds", Microporous and Mesoporous Materials, 2012, vol. 163, pp. 282-290.

Y. Kamimura et al., "Seed-assisted, OSDA-free synthesis of MTW-type zeolite and "Green MTW" from sodium aluminosilicate gel systems", Microporous and Mesoporous Materials, 2012, vol. 147, pp. 149-156.

C. S. Cundy et al., "The hydrothermal synthesis of zeolites: Precursors, intermediates and reaction mechanism", Microporous and Mesoporous Materials, 2005, vol. 82, pp. 1-78.

M. Itakura et al., "Synthesis of high-silica CHA type zeolite by interzeolite conversion of FUA type zeolite in the presence of seed crystals", Microporous and Mesoporous Materials, 2011, vol. 144, pp. 91-96.

M. Itakura et al., "Synthesis of high-silica offretite by the interzeolite conversion method", Materials Research Bulletin, 2010, vol. 45, pp. 646-650.

Sigmund M. Csicsery, "Shape-selective catalysis in zeolites", Zeolites, 1984, vol. 4, pp. 202-213.

* cited by examiner

INTERZEOLITE TRANSFORMATION AND METAL ENCAPSULATION IN THE ABSENCE OF AN SDA

CROSS REFERENCE TO RELATED APPLICATION

The present application claim priority to provisional application 62/028,255 filed on Jul. 23, 2014, the disclosure of which is expressly incorporated herein by reference in its entirety.

FIELD OF INVENTION

The present invention relates to zeolites having metals encapsulated therein and methods for preparing same. More specifically, the zeolites are prepared by interzeolite transformation through direct hydrothermal synthesis without an SDA.

BACKGROUND

Zeolites are ordered microporous aluminosilicates with well-defined crystal structures. Voids of molecular dimensions allow zeolites to catalyze chemical reactions with unique reactivities and selectivities. Synthesis protocols for encapsulating metal clusters within zeolites can expand the diversity of catalytic chemistries, made possible by the ability of microporous solids to select reactants, transition states, and products based on their molecular size and shape, and to protect active sites from larger species that act as poisons by titrating active sites. General protocols for encapsulating metal clusters within zeolites of different void size and geometry can be used to tailor or select zeolite structures for specific catalytic applications; the methods include ion exchange, incipient wetness and incorporation of metal precursors during synthesis. See for example, Gallezot, P., *Post-Synthesis Modification* I, 2002, p. 257.

The apertures within small and medium-pore zeolites preclude post-synthetic encapsulation protocols via ion-exchange from aqueous media, which require the migration of solvated metal-oxo oligomers that cannot diffuse through the small apertures in such zeolites. Recently, encapsulation methods that exploit the use of ligand-stabilized metal precursors to prevent the premature precipitation of metal precursors as colloidal oxyhydroxides at the high pH and temperatures required for hydrothermal zeolite crystallization have been developed. These protocols have led to the successful encapsulation of Pt, Pd, Rh, Ir, Re and Ag clusters within LTA and Pt, Pd, Ru and Rh clusters within GIS and SOD. Some zeolites require synthesis temperatures that decompose even ligand-stabilized metal precursors. In such cases, encapsulation is forced by first placing metal clusters within zeolites that form at milder conditions (parent structure) and then subjecting the sample to the conditions that convert this parent zeolite to the intended framework (daughter structure), while preserving encapsulation. These protocols have led to the successful encapsulation of Pt and Ru clusters within ANA.

MFI (ZSM-5) is a medium-pore silica-rich zeolite that typically requires high crystallization temperatures (423-473 K) and pH (>11) for its template-free synthesis. Encapsulation in such materials remains inaccessible via procedures involving direct hydrothermal synthesis using ligand-stabilized metal precursors, as well as post-synthesis exchange, except in the case of monovalent or divalent cations.

It would be of benefit to the industry if more efficient and facile methods of metal encapsulation were available for silica-rich zeolites.

SUMMARY OF THE INVENTION

Provided is a method of encapsulating a metal in a zeolite by the method of:

(a) inserting a metal precursor into a lower framework density (FD) zeolite, and (b) converting the lower framework density (FD) zeolite to a zeolite having higher framework density values in the absence of an organic structure directing agent (SDA). The conversion is generally conducted by direct hydrothermal synthesis.

In one embodiment, the metal is Pt, Rh, Ru or Cu. In another embodiment, the zeolite having higher framework density values is ZSM-5, SSZ-35, ZSM-12 or chabazite.

In one embodiment, the zeolite having higher framework density values is a silica-rich zeolite, having a Si/Al ratio of 10 or higher.

Among other factors, it has been discovered by the inventors that a general strategy for the encapsulation of metal clusters within silica-rich zeolites such as ZSM-5, SSZ-35, ZSM-12 or chabazite is possible by exploiting interzeolite transformations of low framework density parent structures, such as BEA or FAU zeolites, into zeolite daughter structures, without the need for organic structure directing agents (SDA). The catalytic consequences of the selective encapsulation of metal clusters (Pt, Ru, Rh, Cu) within the void spaces of silica-rich frameworks such as ZSM-5 have also been discovered.

These interzeolite transformations provide a general and convenient route for the encapsulation of clusters within microporous solids in those cases for which the successful placement of precursors can be accomplished within a large pore parent zeolite structure via post-synthesis exchange or during hydrothermal crystallization. This parent structure, containing metal clusters within its microporous voids, can then be recrystallized without loss of encapsulation into a daughter structure of higher framework density, for example MFI (ZSM-5), for which more direct methods of encapsulation are unavailable or impractical. The transformation also occurs without use of an SDA. The overall process is efficient and facile.

DETAILED DESCRIPTION

Figure 1B:
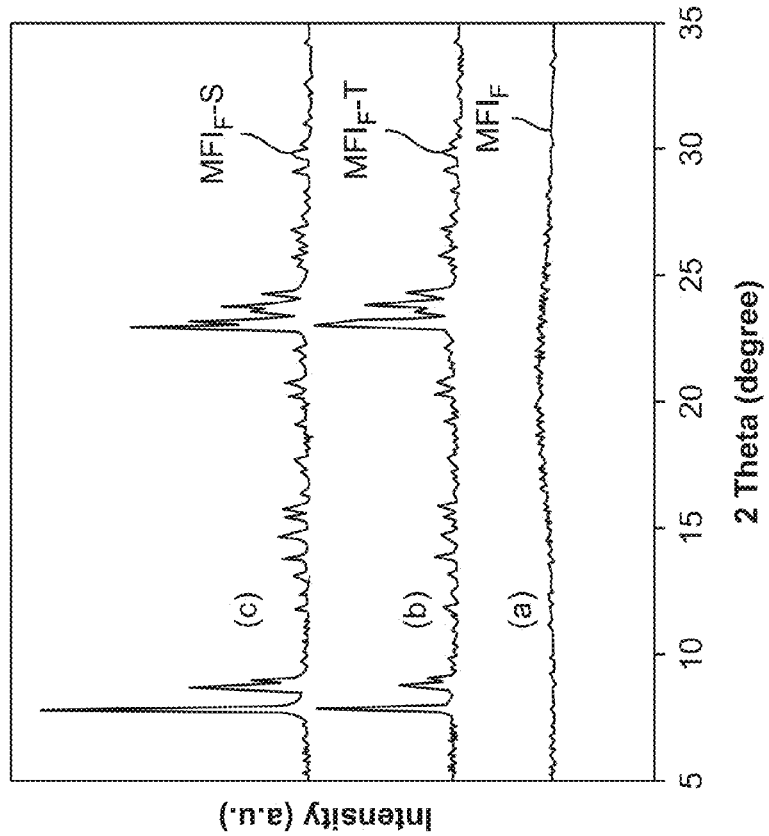
FIG. 1B shows X-ray diffraction patterns of the products synthesized from FAU (Si/Al=40) parent zeolites via (a) direct, (b) template-assisted (using TPABr), and (c) seed-assisted transformations (using MFI seeds). Syntheses were carried out at 423 K, $NaOH/SiO_2$=0.50 (from FAU) and $H_2O/SiO_2$=95 (from FAU). See also Table 1.

The present invention provides one with a method of encapsulating a metal within a zeolite. The zeolite product is a zeolite having a higher framework density value than the zeolite which is converted. For example, a BEA (FD 15.3) or FAU (FD 13.3) zeolite containing a metal or metal precursor can be converted into a MFI (FD 18.4), STF (FD 16.9) MTW (FD 18.2) or CHA (FD 15.1) zeolite preserving the metal encapsulation. The framework density (FD) is defined as T atoms/nm3, where T stands for Si or Al atoms in the zeolite framework. The framework density (FD) value can be an absolute value or a normalized value on the basis of a theoretical all-silica framework structure. Either can be used as the relative values will be consistent in reflecting higher or lower framework density values. The conversion occurs without the need for an organic SDA, while still preserving the metal encapsulation. Particular application is found in converting 12-ring structures such as BEA and FAU into eight or ten ring structures such as MFI, MTW, STF and CHA. However, the conversion is from a lower framework density zeolite to a higher framework density zeolite, regardless of the ring structure.

Of particular applicability are conversions to silica-rich zeolites encapsulating a metal where the Si/Al ratio is 10 or higher, and preferably 22, or even 25 or higher. Also, the metal precursor in aqueous solution with its hydrated double layer is often larger than the pore size of the product or daughter zeolite, so that the metal or metal cluster could not be inserted into the product zeolite using conventional methods such as ion exchange or impregnation.

The present method comprises inserting a metal precursor into a lower framework density zeolite. The lower framework density zeolite is then converted to the higher framework zeolite in the absence of a structuring directing agent (SDA). The presence of an organic SDA is not required in the present process. Typically, seed crystals of the daughter or product zeolite are added to the parent or lower FD zeolite prior to or during the conversion. If the lower FD zeolite and the higher FD zeolite have a common structural motif, however, even seed crystals are not needed. As then the composite building units are substantially similar and the higher density daughter frameworks can be readily achieved.

By the absence of a structure directing agent (SDA) is meant that the synthesis is free of soluble SDA. The present synthesis need not use a SDA reagent as in convention synthesis. Thus there is no soluble SDA in the synthesis. While seeds of a zeolite can be used, i.e., such seeds being as-made materials, externally added, it has been found that the SDA that may be associated with the seeds is trapped in the interior of the zeolites, and cannot get out of the zeolite to impact the synthesis. In other words, the new zeolite is not nucleated by liberated SDA from the seeds. There is no liberated SDA from the seeds, and the synthesis remains free of soluble SDA.

The conversion has been found to occur via direct hydrothermal synthesis. The conversion is generally conducted in a basic solution, e.g., pH>7, up to 13. The temperature of the hydrothermal synthesis can be any suitable temperature, and can be above the crystallization temperature of the lower FD zeolite.

In practicing the present method, a balance of the conditions and components can provide improved results. For example, the NaOH content is balanced with the time and temperature used in the conversion method. In the conversion, in general, the silica and alumina are contributed by the source zeolite (e.g., FAU) and any seeds. The $NaOH/SiO_2$ ratio generally ranges from 0.25-1.00, and the $H_2O/SiO_2$ ratio is generally greater than 50. The time for the conversion in one embodiment ranges from about 1 to about 80 hours, and in one embodiment, the temperature is that above the crystallization temperature of the lower FD zeolite, which in general can be greater than 85° C., in the range of from 85-130° C., or even higher, e.g., greater than 130° C., such as in the range of from 130-160° C.

Examples of suitable lower framework density zeolites include Y zeolites, BEA and FAU. Examples of suitable higher framework density zeolites include MFI (ZSM-5), CHA (chabazite), STF (SSZ-35) and MTW (ZSM-12).

The present method can be applied to the encapsulation of any metal that cannot be ion-exchanged or impregnated directly into the daughter zeolite pores. Examples of the many metals that can be successfully encapsulated by the present invention, without using an SDA, are Pt, Rh, Ru or Cu, as well as Co, Fe, V, IR, Pd, Re, Ag, and Au. The metal is generally added to the lower FD zeolite as a metal precursor. The metal precursor can be an amine or ethylene diamine complex. The metal precursor can also be a ligated metal.

In one embodiment of the present process, the lower FD zeolite used is BEA or FAU, the metal is Pt, Rh or Ru and the higher FD zeolite is ZSM-5 (MFI).

In one embodiment of the present process, the lower FD zeolite used is a Y zeolite. It can be also FAU. The metal is encapsulated copper and the higher FD zeolite is chabazite, SSZ-35 or ZSM-12. Encapsulating copper into chabazite by the present process holds particular advantages with regard to useful applications and simplicity.

It has also been found that by the present process of not using an SDA, one can better control the position of the metal within the daughter or product zeolite, e.g., chabazite, SSZ-35 and ZSM-12, in a very advantageous position. Such positioning allows for excellent catalytic advantages. The present process allows for better control over the placement of the metal. This is of particular usefulness when creating a chabazite zeolite encapsulating copper.

In general, therefore, the encapsulation of metal clusters e.g. Pt, Ru, Rh, Cu, within silica-rich, higher FD zeolites such as ZSM-5, SSZ-35, ZSM-12 or chabazite, can be achieved by the simple process of the present invention involving exchanging cationic metal precursors into a parent zeolite (BEA, FAU), reducing them with $H_2$ to form metal clusters, and transforming these zeolites into daughter frameworks of higher density under hydrothermal conditions. These transformations can require seeds of the higher FD zeolite for converting FAU parent zeolites, and can occur with the retention of encapsulated clusters. Seeds can also be used with BEA as the parent or low FD zeolite, but may not be needed when converting to MFI (ZSM-5). Clusters uniform in size (e.g., 1.3-1.7 nm) and exposing clean and accessible surfaces are generally formed in BEA and FAU zeolites, their size remaining essentially unchanged upon transformation into the ZSM-5. Encapsulation into ZSM-5 via direct hydrothermal syntheses was found unsuccessful because metal precursors precipitated prematurely at the pH and temperatures required for MFI synthesis. Delayed introduction of metal precursors and $F^-$ (instead of $OH^-$) as the mineralizing agent in hydrothermal syntheses increased encapsulation selectivities, but they remained lower than those achieved via the present invention (interzeolite transformations).

These interconversions of the present invention provide a general and robust strategy for encapsulation of metals when precursors can be introduced via exchange into a zeolite that can be transformed into target daughter zeolites with higher framework densities, whether spontaneously or by using seeds.

The following examples are provided in order to further illustrate the present invention. The examples are only illustrative, and are not meant to be limiting.

EXAMPLES 1-4

Materials used in Examples 1-4 include fumed $SiO_2$ (Cab-O-Sil, HS-5, 310 $m^2$ $g^{-1}$), NaOH (99.995%, Sigma Aldrich), FAU (CBV780, Zeolyst, H-FAU, Si/Al=40), BEA (CP811E-75, Zeolyst, H-BEA, Si/Al=37.5), tetrapropylammonium bromide (TPABr; 98%, Sigma Aldrich), $NaAlO_2$ (anhydrous, Riedel-de Haen, technical), $Al(NO_3)_3 \cdot 9H_2O$ (>98%, Strem Chemical), $NH_4F$ (>98%, Fluka), tetraethyl orthosilicate (TEOS; 98%, Sigma Aldrich), $[Pt(NH_3)_4](NO_3)_2$ (99.99%, Alfa Aesar), $[Rh(NH_2CH_2CH_2NH_2)_3]Cl_3 \cdot 3H_2O$ (≥99.5%, Aldrich), $RuCl_3$ (45-55% wt. Ru, Sigma Aldrich), Ludox AS-30 colloidal silica (30% wt. suspension in $H_2O$, Sigma Aldrich), $[Ru(NH_3)_6]Cl_3$ (98%, Aldrich), toluene (≥99.9%, Aldrich), 1,3,5-trimethyl benzene (98%, Aldrich), 1,3,5-triisopropyl benzene (98%, Aldrich), He (99.999%, Praxair), Air (99.999%, Praxair), 0.5% $O_2$/He (99.999%, Praxair), 9% $H_2$/He (99.999%, Praxair) and $H_2$ (99.999%, Praxair) which were used as received.

ZSM-5 Seed Crystals

In a typical synthesis, 649 g of water, 740 g of 1 mol $L^{-1}$ NaOH (Baker Reagent), 98 g of tetrapropylammonium bromide (Kodak Chemicals) were added to 872 g of Ludox AS-30 colloidal $SiO_2$ (Dupont). The synthesis mixture was then transferred into a Hastelloy-lined stainless steel autoclave (3.8 L), pressure tested and held at 423 K for 4 days in a convection oven under rotation (78 rpm). After 4 days, the autoclave was cooled and the resulting solid was collected by filtration and washed with deionized water until the rinse liquids reached a pH of 7-8. The resulting product was crystalline MFI (Si/Al~300), confirmed by powder X-ray diffraction.

EXAMPLE 1

In a typical synthesis, zeolite BEA (Si/Al=37.5) or FAU (Si/Al=40) was added (0.5-1.0 g) to an aqueous NaOH solution, into which the MFI seed crystals or structure-directing agents (TPABr) were added to prepare final mixtures with molar compositions listed in Table 1 below. These mixtures were placed within sealed polypropylene containers (Nalgene, 125 $cm^3$) and homogenized by vigorous magnetic stirring (400 rpm) for 1 h at ambient temperature. The mixture was then transferred into a Teflon-lined stainless steel autoclave and held at 423 K for 24-40 h under static conditions. The resulting solids were collected by filtration through a fritted disc Buchner filter funnel (Chemglass, 150 ml, F) and washed with deionized water (17.9 MΩ resistivity) until the rinse liquids reached a pH of 7-8. The sample was treated in convection oven at 373 K overnight and the solid yield of the resulting product was defined as $$\text{Yield (\%)} = \frac{\text{Product (g)}}{\text{Parent zeolite (g)}} \times 100 \quad (1)$$

The resulting product was then heated in air (1.67 $cm^3$ $g^{-1}$ $s^{-1}$) to 623 K at 0.03 K $s^{-1}$ and held at this temperature for 3 h. The samples after treatment were denoted as $MFI_B$, $MFI_B$-T, $MFI_B$-S, when synthesized from BEA, and $MFI_F$, $MFI_F$-T, $MFI_F$-S, when synthesized from FAU, in the direct, template-assisted and seed-assisted interzeolite transformations, respectively.

TABLE 1

Initial synthesis molar compositions, product phase, and yield of the samples[a].

| Sample Name | Parent zeolite (Si/Al) | MFI Seeds % wt.[b] | Time of Synthesis (h) | Additional (SDA/Seed)[b] | Product Phase | Yield[d] (%) | Product (Si/Al) |
|---|---|---|---|---|---|---|---|
| $MFI_B$ | BEA(37.5) | 0 | 24 | — | MFI | 51.0 | 13 |
| $MFI_B$-T | BEA(37.5) | 0 | 24 | TPABr | MFI | 52.0 | 35 |
| $MFI_B$-S | BEA(37.5) | 10 | 24 | Seeds | MFI | 51.8 | 23 |
| $Pt/MFI_B$ | Pt/BEA(37.5) | 10 | 30 | Seeds | MFI | 52.5 | 26 |
| $Ru/MFI_B$ | Ru/BEA(37.5) | 10 | 30 | Seeds | MFI | 52.0 | 29 |
| $MFI_F$ | FAU(40) | 0 | 40 | — | Amor. | 83.0 | — |
| $MFI_F$-T | FAU(40) | 0 | 40 | TPABr | MFI | 63.7 | 33 |
| $MFI_F$-S | FAU(40) | 10 | 40 | Seeds | MFI | 51.8 | 21 |

TABLE 1-continued

Initial synthesis molar compositions, product phase, and yield of the samples[a].

| Sample Name | Parent zeolite (Si/Al) | MFI Seeds % wt.[b] | Time of Synthesis (h) | Additional (SDA/Seed)[b] | Product Phase | Yield[d] (%) | Product (Si/Al) |
|---|---|---|---|---|---|---|---|
| Pt/MFI$_F$ | Pt/FAU(40) | 10 | 40 | Seeds | MFI | 53.4 | 29 |
| Ru/MFI$_F$ | Ru/FAU(40) | 10 | 40 | Seeds | MFI | 62.5 | 25 |
| Rh/MFI$_F$ | Rh/FAU(40) | 10 | 40 | Seeds | MFI | 61.8 | 28 |

[a] NaOH/SiO$_2$ = 0.35, H$_2$O/SiO$_2$ = 65 for transformations of BEA and NaOH/SiO$_2$ = 0.5, H$_2$O/SiO$_2$ = 95 for FAU at 423 K.

[b] Seed (wt. %) = $\frac{\text{seed material (g)}}{\text{Parent zeolite (g)}} \times 100$

[c] Initial synthesis molar composition excludes the SiO$_2$ amount of seed material.

[d] yield (%) = $\frac{\text{Product (g)}}{\text{Parent zeolite (g)}} \times 100$

EXAMPLE 2

Metals (M=Pt, Ru, Rh) encapsulated within BEA or FAU were prepared by ion exchange from aqueous solutions of [Pt(NH$_3$)$_4$](NO$_3$)$_2$, [Rh(NH$_2$CH$_2$CH$_2$NH$_2$)$_3$]Cl$_3$.3H$_2$O or [Ru(NH$_3$)$_6$]Cl$_3$ (10:1 mass ratio of H$_2$O:zeolite, to achieve ~1% wt. metal content) at 353 K by magnetic stirring (400 rpm) for 8 h. The solids obtained were collected by filtration through a fritted disc Buchner filter funnel (Chemglass, 150 ml, F) and washed with deionized water until the rinse liquids reached a pH of 7-8. These samples were then treated in convection oven at 373 K overnight and heated in air (1.67 cm$^3$ g$^{-1}$ s$^{-1}$) to 623 K at 0.03 K s$^{-1}$ and held for 3 h; the metal precursors were then exposed to a flow of 9% H$_2$/He (1.67 cm$^3$ g$^{-1}$ s$^{-1}$) and heated to 573 K at 0.03 K s$^{-1}$ and held for 2 h. After this treatment, the samples were passivated in 0.5% O$_2$/He flow (1.67 cm$^3$ g$^{-1}$ s$^{-1}$) for 1 h at room temperature before exposure to ambient air. The resulting samples after treatment were denoted as M/BEA and M/FAU (M=Pt, Ru, Rh), synthesized from BEA and FAU, respectively.

EXAMPLE 3

The encapsulation of metal clusters within MFI was achieved by interzeolite transformations, consistent with the present invention, of M/BEA (M=Pt, Ru), using M/BEA samples as parent zeolites. M/BEA (M=Pt, Ru) samples (0.5-1.0 g) were added to an aqueous NaOH solution to prepare mixtures with molar compositions listed in Table 1. These mixtures were placed within sealed polypropylene containers (Nalgene, 125 cm$^3$) and homogenized by vigorous magnetic stirring (400 rpm) for 1 h at ambient temperature. The mixture was then transferred into a Teflon-lined stainless steel autoclave and held at 423 K under static conditions for 30 h. The resulting solids were collected by filtration through a fritted disc Buchner filter funnel (Chemglass, 150 ml, F) and washed with deionized water until the rinse liquids reached a pH of 7-8. These samples were then treated in ambient air at 373 K overnight and heated in air (1.67 cm$^3$ g$^{-1}$ s$^{-1}$) to 673 K at 0.03 K s$^{-1}$ and held for 3 h; the metal precursors were then exposed to a flow of 9% H$_2$/He (1.67 cm$^3$ g$^{-1}$ s$^{-1}$) and heated to 623 K at 0.03 K s$^{-1}$ and held for 2 h. After this treatment, the samples were passivated in 0.5% O$_2$/He flow (1.67 cm$^3$ g$^{-1}$ s$^{-1}$) for 1 h at room temperature before exposure to ambient air. The resulting samples after treatment were denoted as M/MFI$_B$ (M=Pt, Ru), synthesized via interzeolite transformations of M/BEA parent zeolites.

EXAMPLE 4

The encapsulation of metal clusters within MFI was also achieved by interzeolite transformations of M/FAU (M=Pt, Ru, Rh), using M/FAU samples as parent zeolites. M/FAU (M=Pt, Ru, Rh) samples (0.5-1.0 g) were added to an aqueous NaOH solution along with 10% wt. MFI seeds (% wt. based on parent FAU) to prepare mixtures with molar compositions listed in Table 1. All of the subsequent synthesis and treatment steps were identical to those described for M/MFI$_B$ samples synthesized via interzeolite transformation of M/BEA samples. The resulting samples after treatment were denoted as M/MFI$_F$ (M=Pt, Ru, Rh), synthesized via interzeolite transformations of M/FAU parent zeolites.

Structural Characterization for Examples 1-4

The identity and phase purity of product zeolites as well as the absence of large metal clusters were demonstrated by powder X-ray diffraction (Cu Kα radiation λ=0.15418 nm, 40 kV, 40 mA, Bruker D8 Advance). Diffractograms were measured for 2θ values of 5-50° at 0.02° intervals with a 2 s scan time. Si, Al, Na, and metal (Pt, Ru, or Rh) contents were measured by inductively-coupled plasma atomic emission spectroscopy (IRIS Intrepid spectrometer; Galbraith Laboratories). The dispersion of the metal clusters was determined by H$_2$ chemisorption uptakes using volumetric methods. Samples were heated to 623 K at 0.03 K s$^{-1}$ in flowing H$_2$ (1.67 cm$^3$ s$^{-1}$ g$^{-1}$) and held for 1 h and then evacuated for 1 h at 623 K to remove any weakly-adsorbed hydrogen before being cooled to 298 K. Hydrogen chemisorption uptakes were measured at 298 K and 5-50 kPa of H$_2$ on metal containing samples. Dispersions were determined from the difference between total and irreversible H$_2$ uptakes, extrapolated to zero pressure, using a 1:1 H:M$_{surface}$ (M=Pt, Ru, Rh) adsorption stoichiometry. Transmission electron microscopy (TEM) images were taken with Philips/FEI Tecnai 12 microscope operated at 120 kV. Before TEM analysis, the samples were suspended in ethanol and dispersed onto ultrathin carbon/holey carbon films supported on 400 mesh Cu grids (Ted Pella Inc.). Size distributions of metal clusters were determined from measuring more than 300 clusters for each sample. Surface-averaged cluster diameters, d$_{TEM}$, were calculated using $$d_{TEM} = \frac{\Sigma n_i d_i^3}{\Sigma n_i d_i^2} \quad (2)$$

where n$_i$ is the number of crystallites having a diameter d$_i$. TEM-derived size distributions were also used to calculate the dispersity index (DI) of the metal clusters. The DI value is given by surface-averaged diameter (d$_{TEM}$; Eq. 2) divided by the number-averaged diameter (d$_n$=Σn$_i$d$_i$/Σn$_i$) [30].

$$\text{Dispersity Index } (DI) = \frac{d_{TEM}}{d_n} = \frac{\left(\frac{\Sigma n_i d_i^3}{\Sigma n_i d_i^2}\right)}{\left(\frac{\Sigma n_i d_i}{\Sigma n_i}\right)} \quad (3)$$

This parameter is a measure of the cluster size heterogeneity of metal clusters, with a value of unity reflecting unimodal clusters and values smaller than 1.5 indicating relatively uniform size distributions.

Catalytic Rate Measurements for Examples 2-4

Toluene, 1,3,5-trimethyl benzene (1,3,5-TMB), and 1,3,5-triisopropyl benzene (1,3,5-TIPB) hydrogenation rates were measured on catalyst samples diluted with fumed $SiO_2$ (Cab-O-Sil, HS-5, 310 $m^2$ $g^{-1}$) using a quartz tubular reactor with plug-flow dynamics. Dilution was achieved by intimate mixing at a diluent/catalyst mass ratio of 10, pelletizing and sieving the granules to retain aggregates of 0.18-0.25 mm diameter. These granules (5-25 mg) were then mixed with acid-washed quartz granules of similar size (Fluka, acid-purified, 1.0 g, 0.18-0.25 mm). Such dilution was used to avoid intrapellet or bed concentration and temperature gradients.

Pre-reduced and passivated samples were treated in flowing $H_2$ (1.67 $cm^3$ $g^{-1}$ $s^{-1}$) by heating to 623 K at 0.03 K $s^{-1}$ and holding for 1 h prior to measuring hydrogenation rates. Arene hydrogenation rates were measured with 0.35 kPa toluene or 0.26 kPa 1,3,5-TMB or 0.15 kPa 1,3,5-TIPB and 100 kPa $H_2$ at 473 K. Toluene (0.59 nm kinetic diameter), but not 1,3,5-TMB (0.74 nm kinetic diameter) for MFI (0.53×0.56 nm) and 1,3,5-TIPB for BEA (~0.70 nm aperture) and FAU (0.74 nm aperture), can diffuse through the apertures of zeolites and access active sites contained within the zeolitic voids. Rates are reported as turnover rates, defined as hydrogenation rates normalized by the number of surface metal atoms determined from hydrogen chemisorption uptakes. Reactant and product concentrations were measured by gas chromatography (Agilent 6890GC) using a methyl-silicone capillary column (HP-1; 50 m×0.25 mm, 0.25 μm film thickness) connected to a flame ionization detector. Quartz, fumed $SiO_2$ or metal-free zeolites did not give detectable hydrogenation rates for any of these reactants and measured rates did not depend on the extent of dilution or on time on stream for any of the catalysts, consistent with absence of temperature or concentration gradients and of detectable deactivation.

Interzeolite transformations can provide an alternate synthetic route for the encapsulation of metal clusters within zeolitic voids, when a zeolite of lower framework density and larger apertures can be used to initially contain metal precursors or clusters, particularly higher-valent metal precursors. Such materials can then be subsequently converted to a zeolite with higher framework density and smaller apertures while retaining the encapsulated species within the zeolitic voids.

Interzeolite transformations can convert structures with lower framework densities into those with higher framework densities, which tend to be thermodynamically more stable. These interconversions may avoid costly organic templates and/or decrease crystallization times. This would be of particular value in preparing higher framework density zeolites having a higher Si/Al ratio, e.g., greater than 10, or even 50. They may also provide more general routes for encapsulating clusters within those zeolites that would otherwise require synthesis temperatures that lead to the decomposition of metal precursors during hydrothermal syntheses, even for precursors containing protecting ligands. Thermodynamics typically allow transformations that increase the zeolite framework density (FD; reported here as T atoms/$nm^3$), but not all such processes are kinetically-accessible under the hydrothermal conditions that are required for the synthesis of daughter structures.

BEA (FD 15.3) and FAU (FD 13.3) can be recrystallized to zeolites with higher framework densities in aqueous NaOH solution at temperatures above those that cause their own respective crystallizations from amorphous silica-alumina precursors under hydrothermal conditions (360-400 K). Crystalline MFI (FD 18.4) samples were successfully synthesized from BEA, in the presence or absence of MFI seeds, using aqueous NaOH solutions under autogenous pressures at 423 K (Molar compositions, Table 1). Thus, we conclude that this transformation can occur spontaneously, without significant kinetic hindrance, and even in the absence of MFI seeds or organic structure-directing agents (SDA).

The framework structures and composite building units (CBU) of the parent BEA and daughter MFI zeolites include a common mor structural motif, while FAU and MFI lack such a common CBU. It seems plausible, therefore, that a CBU, present in BEA and required to form MFI, remains essentially intact within the BEA-derived intermediates during its conversion to MFI; this CBU may aid the local nucleation of MFI and, in doing so, reduce kinetic hurdles, thus allowing the BEA transformation into MFI to occur without even seeds. As a consequence, BEA to MFI transformations (X-ray diffractograms, (FIG. 1A)), containing mor as a common building unit, become kinetically feasible. This common CBU could serve as kinetic mediator for nucleating the daughter structure, suggesting that zeolites containing common CBU elements may be able to overcome kinetic barriers that obstruct their interconversions in the direction dictated by the thermodynamic tendency of zeolites to form structures with greater framework densities.

The presence of a common CBU between parent and product zeolites, or in the absence of it, product seeds in the synthesis assists the nucleation of MFI crystals and do so more effectively from intermediates formed from parent zeolites than from amorphous silica and alumina gels, resulting in significantly shorter synthesis times. As a result, such protocols may provide alternate routes to the synthesis of some zeolites; such routes may shorten crystallization times and decrease the cost and environmental impact associated with organic moieties.

EXAMPLES 5-8

The examples in this section describe the synthesis, structural characterization, and catalytic properties of Pt, Ru and Rh metal clusters within BEA and FAU parent zeolites, with the intent to use these materials for subsequent conversion to MFI. BEA and FAU containing metals (M/BEA and M/FAU, respectively; M=Pt, Ru, Rh) were synthesized via ion-exchange with Pt, Rh, and Ru precursors in aqueous solutions of $[Pt(NH_3)_4](NO_3)_2$, $[Ru(NH_3)_6]Cl_3$ or $[Rh(NH_2CH_2CH_2NH_2)_3]Cl_3 \cdot 3H_2O$ at 353 K (using the procedures described in Example 2).

Figure 3A:
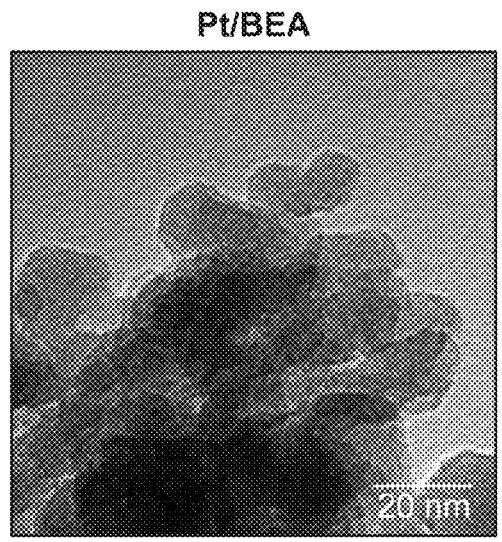
FIG. 3A shows TEM images and FIG. 3B shows metal cluster size distributions of parent BEA.
Figure 3B:
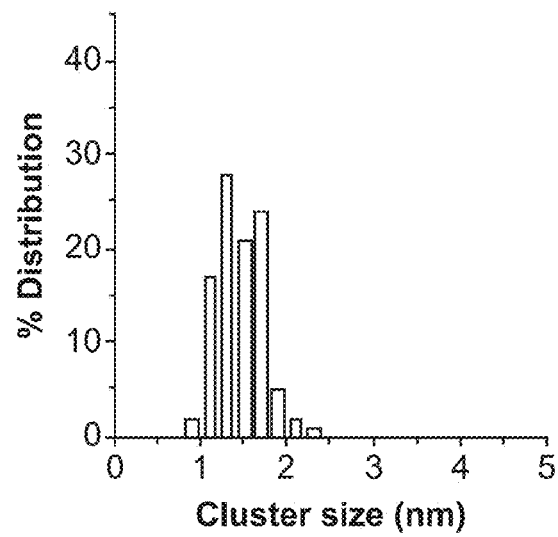
Figure 3C:
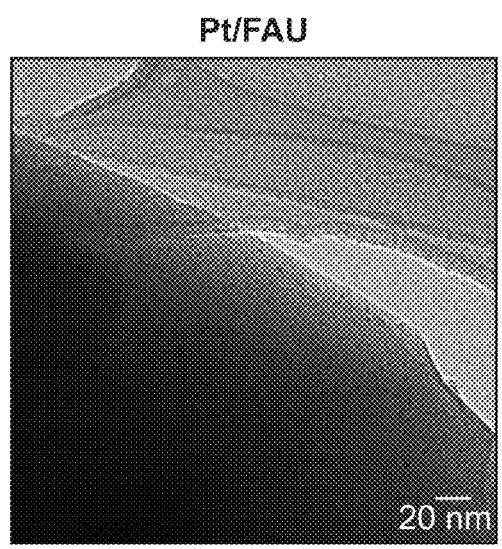
FIG. 3C shows TEM images and FIG. 3D shows metal cluster size distributions of FAU zeolites containing Pt clusters, synthesized by ion exchange methods.
Figure 3D:
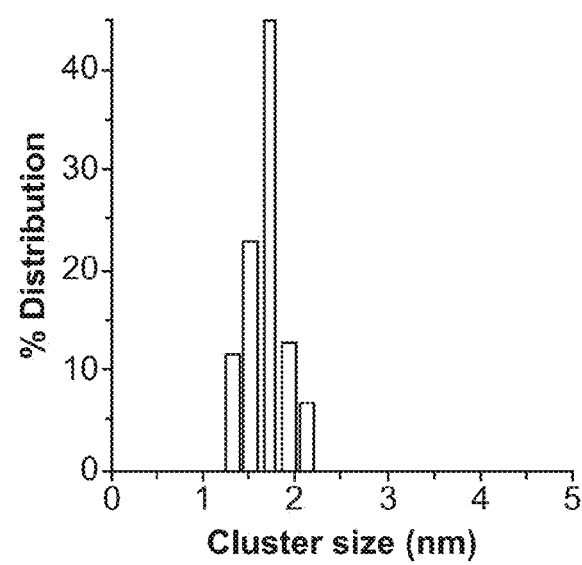
Figure 3E:
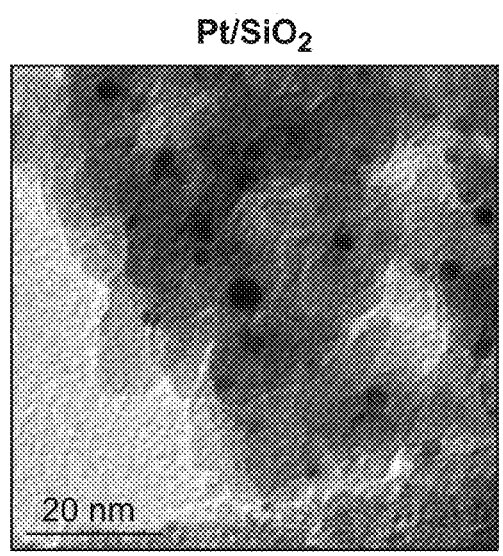
FIG. 3E shows TEM images and FIG. 3F shows metal cluster size distributions of Pt clusters dispersed on $SiO_2$, synthesized by incipient wetness impregnation method.
Figure 3F:
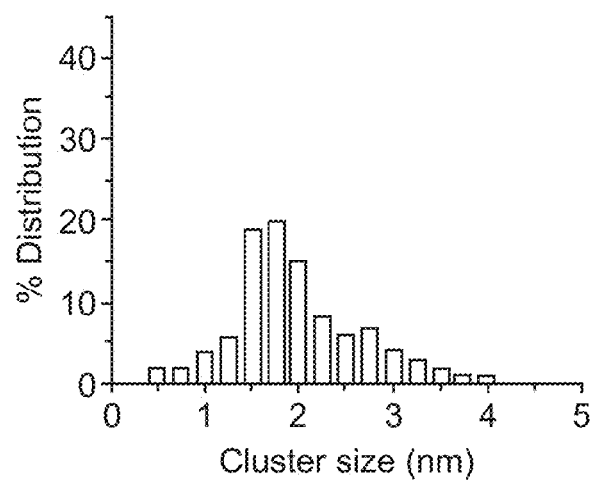

TEM images of Pt clusters dispersed on BEA and FAU zeolites after exchange and thermal treatment in flowing air at 623 K for 3 h and in $H_2$ at 573 K for 2 h are shown in FIGS. 3A, 3C, and 3E. These images show the presence of small Pt clusters in BEA ($d_{TEM}$=1.6 nm; Table 2 below, calculated using Eq. 2) and FAU ($d_{TEM}$=1.7 nm; Table 2); these clusters are narrowly distributed in size (DI=1.07 and 1.03 for BEA and FAU, respectively; Table 2, from Eq. 3) and reside throughout zeolite crystals. Chemisorptive titrations of metal surfaces with $H_2$ gave Pt fractional dispersions of 0.88 for Pt/BEA and 0.78 for Pt/FAU (Table 2); these values correspond to mean cluster diameters ($d_{chem}$) of 1.3 and 1.4 nm, respectively, when clusters are spherical and have the bulk density of Pt metal. In contrast, Pt clusters at similar loading and prepared by incipient wetness impregnation of mesoporous $SiO_2$ with same metal precursor are larger (dTEM=2.4 nm, $d_{chem}$=1.8 nm; Table 2) and more broadly distributed (DI=1.96; Table 2) than in Pt/BEA and Pt/FAU samples, suggesting that confinement within small zeolite voids inhibits sintering and the concomitant broadening of the cluster size distribution. The chemisorption-derived Pt cluster diameters (1.3-1.4 nm) in these zeolitic samples agree well with those measured by TEM (1.4-1.7 nm), indicating that the clusters detectable by microscopy contain clean surfaces accessible for chemisorption by $H_2$ titrants and that the ligands present during synthesis were completely removed by the thermal treatments used. Similarly, Ru clusters dispersed in BEA and Ru and Rh clusters in FAU show $d_{TEM}$ values of 1.4, 1.7 and 1.5 nm, DI values of 1.08, 1.16 and 1.09 and $d_{chem}$ values of 1.4, 1.5 and 1.3 nm, respectively, also consistent with the presence of small, uniform and clean metal clusters dispersed throughout the BEA and FAU parent zeolites.

TABLE 2

Metal loadings, dispersions, mean sizes, and dispersity of metal clusters dispersed on $SiO_2$, BEA, and MFI.

| Sample | Metal loading (% wt.)[a] | D[b] | $d_{chem}$[c] (nm) | $d_{TEM}$[d] (nm) | Dispersity Index (DI) |
|---|---|---|---|---|---|
| Pt/SiO$_2$ | 0.79 | 0.61 | 1.8 | 2.4 | 1.96 |
| Ru/SiO$_2$ | 0.51 | 0.22 | 3.7 | 4.8 | — |
| Rh/SiO$_2$ | 1.10 | 0.60 | 1.8 | 2.1 | — |
| Pt/BEA | 0.85 | 0.88 | 1.3 | 1.6 | 1.07 |
| Ru/BEA | 0.64 | 0.63 | 1.4 | 1.4 | 1.08 |
| Pt/FAU | 1.23 | 0.78 | 1.4 | 1.7 | 1.03 |
| Ru/FAU | 0.95 | 0.59 | 1.5 | 1.7 | 1.16 |
| Rh/FAU | 0.80 | 0.85 | 1.3 | 1.5 | 1.09 |
| Pt/MFI$_B$ | 1.01 | 0.80 | 1.4 | 1.7 | 1.41 |
| Ru/MFI$_B$ | 1.23 | 0.70 | 1.2 | 1.3 | 1.16 |
| Pt/MFI$_F$ | 1.23 | 0.75 | 1.5 | 1.0 | 1.08 |
| Ru/MFI$_F$ | 1.33 | 0.72 | 1.2 | 1.5 | 1.16 |
| Rh/MFI$_F$ | 1.55 | 0.96 | 1.1 | 1.5 | 1.09 |

[a]Analyzed by inductively coupled plasma optical emission spectroscopy.
[b]Metal dispersion estimated from $H_2$ chemisorptions.
[c]Mean cluster diameter estimated from the metal dispersion obtained from $H_2$ chemisorption measurements
[d]Surface-area-weighted mean cluster diameter ($d_{TEM}$) estimated from TEM analysis, $d_{TEM} = \Sigma n_i d_i^3 / \Sigma n_i d_i^2$.

EXAMPLE 5

The small apertures in zeolites allow them to sieve reactants and products based on their molecular size. The relative reaction rates for small and large reactants at sites residing within accessible and inaccessible locations can be used to assess the fraction of the metal surface area that resides within zeolite voids. The rates of hydrogenation of toluene and 1,3,5-TIPB reactants (0.59 nm and 0.84 nm respective kinetic diameters) were used to confirm the predominant presence of metal (Pt, Ru, Rh) clusters within the parent BEA (~0.7 nm aperture) and FAU (0.74 nm aperture) materials. Toluene, but not 1,3,5-TIPB, can access active metal sites encapsulated within BEA and FAU voids via diffusion through their interconnected voids and apertures.

Encapsulation selectivities were determined by first measuring the rates of hydrogenation of small (toluene) and large (1,3,5-TIPB) reactants on unconstrained clusters dispersed on $SiO_2$ ($\chi_{SiO2} = r_{toulene}/r_{1,3,5-TIPB}$); this rate ratio reflects the relative reactivity of these two reactant molecules in the absence of diffusional constraints. A similar measurement of this ratio on metal-zeolite samples ($\chi_{zeolite}$) can then be used to determine the encapsulation selectivity parameter ($\varphi = \chi_{zeolite}/\chi_{SiO2}$), which reflects the ratio of the surface area of all the clusters in the sample to that of clusters at (fully accessible) locations outside zeolite crystals. The encapsulation selectivity is therefore a rigorous indicator of the extent to which the active surfaces are contained within microporous networks, which toluene (but not 1,3,5-TIPB) can access. This encapsulation selectivity parameter approaches unity for clusters with unimpeded access to reactants, such as those at external zeolite surfaces. Values of $\varphi$ much larger than unity (~10, indicating >90% of the active metal surfaces reside within zeolitic voids), in contrast, provide evidence that metal clusters predominantly reside within regions that restrict access to the large reactants and, therefore, are taken here as evidence of successful encapsulation.

Toluene and 1,3,5-TIPB hydrogenation reactions led to the respective exclusive formation of methyl cyclohexane and (cis- and trans-)1,3,5-tri-isopropyl cyclohexane on all samples. Table 3 below shows arene hydrogenation turnover rates on Pt, Ru, Rh clusters dispersed on BEA (M/BEA), FAU (M/FAU) and $SiO_2$ (M/$SiO_2$). Toluene hydrogenation turnover rates were very similar on Pt/BEA and Pt/FAU than on Pt/$SiO_2$ (Table 3), consistent with the absence of cluster size effects or diffusional constraints for toluene reactions. In contrast, 1,3,5-TIPB turnover rates were much lower than on Pt/BEA and Pt/FAU than on Pt/$SiO_2$ (by factors of 44 and 38, respectively, Table 3), indicating that 1,3,5-TIPB cannot access most of the clusters in BEA and FAU samples. The ratios of toluene to 1,3,5-TIPB hydrogenation turnover rates were therefore much higher on Pt/BEA and Pt/FAU (by factors of 180 and 160, respectively) than on Pt/$SiO_2$ (4.4), resulting in encapsulation selectivity parameters ($\varphi$) of 40.9 and 36.4 for Pt/BEA and Pt/FAU, respectively (Table 3). Encapsulation selectivity parameters (Table 3) were 14.3 and 15.4 for Ru clusters in BEA and FAU parent zeolites, respectively, and 21.8 for Rh clusters in FAU samples. These large encapsulation selectivity values confirm that clusters of all these metals reside preferentially within the void structures of BEA or FAU zeolites when such samples are prepared using the exchange and reduction procedures reported here. These materials are therefore well-suited to assess whether encapsulated metal clusters can (i) interfere with FAU or BEA transformations to MFI and/or (ii) be retained during interzeolite transformations. It should be further noted that in the runs where the metal complex is simply deposited on a silica support, no encapsulation protection is provided. The selectivity term in Table 3 is therefore 1.0.

TABLE 3

Catalytic properties of metal containing BEA, FAU and $SiO_2$ samples in hydrogenation of arenes.[a]

| Sample | $r_{toluene}$[b] (mol (mol$_{surf-metal}^{-1}s^{-1}$)) | $r_{1,3,5-TIPB}$[b] (mol (mol$_{surf-metal}^{-1}s^{-1}$)) | $\chi_j^c$ j = zeolite, $SiO_2$ | $\varphi^d$ |
|---|---|---|---|---|
| Pt/BEA | 1.26 | 0.007 | 180.0 | 40.9 |
| Pt/FAU | 1.28 | 0.008 | 160.0 | 36.4 |

TABLE 3-continued

Catalytic properties of metal containing BEA, FAU and SiO$_2$ samples in hydrogenation of arenes.[a]

| Sample | $r_{toluene}$[b] (mol (mol$_{surf-metal}$$^{-1}$s$^{-1}$)) | $r_{1,3,5\text{-}TIPB}$[b] (mol (mol$_{surf-metal}$$^{-1}$s$^{-1}$)) | $\chi_j$[c] j = zeolite, SiO$_2$ | $\varphi$[d] |
|---|---|---|---|---|
| Pt/SiO$_2$ | 1.35 | 0.306 | 4.4 | 1.0 |
| Ru/BEA | 0.112 | 0.001 | 112.0 | 14.3 |
| Ru/FAU | 0.120 | 0.001 | 120.0 | 15.4 |
| Ru/SiO$_2$ | 0.173 | 0.022 | 7.8 | 1.0 |
| Rh/FAU | 0.019 | 0.0003 | 63.3 | 21.8 |
| Rh/SiO$_2$ | 0.023 | 0.008 | 2.87 | 1.0 |

[a]Hydrogenations were carried out with 0.35 kPa toluene/0.15 kPa 1,3,5-TIPB and 100 kPa H$_2$ at 473 K.
[b]Reaction turnover rate is defined as mole of reactant converted per mol of surface metal atoms per second.
[c]$\chi_j = r_{toluene}/r_{1,3,5\text{-}TIPB}$, j = zeolite, SiO$_2$.
[d]$\varphi = \chi_{zeolite}/\chi_{SiO2}$.

EXAMPLE 6

M/BEA and M/FAU (M=Pt, Ru, Rh) zeolites containing metal clusters are used here as precursor materials to form MFI using the hydrothermal protocols described in Examples 3 and 4, and shown to be successful in the absence of metal clusters. The resulting samples are denoted here as M/MFI$_B$ (derived from M/BEA) and M/MFI$_F$ (derived from M/FAU). Neither seeds nor SDA were used in M/BEA to M/MFI interzeolite transformations; MFI seeds were used (instead of SDA) in M/FAU to M/MFI transformations so as to avoid electrostatic and van der Waals interactions that may cause SDA species to dislodge clusters from intracrystalline MFI voids during hydrothermal interconversion protocols.

Figure 1A:
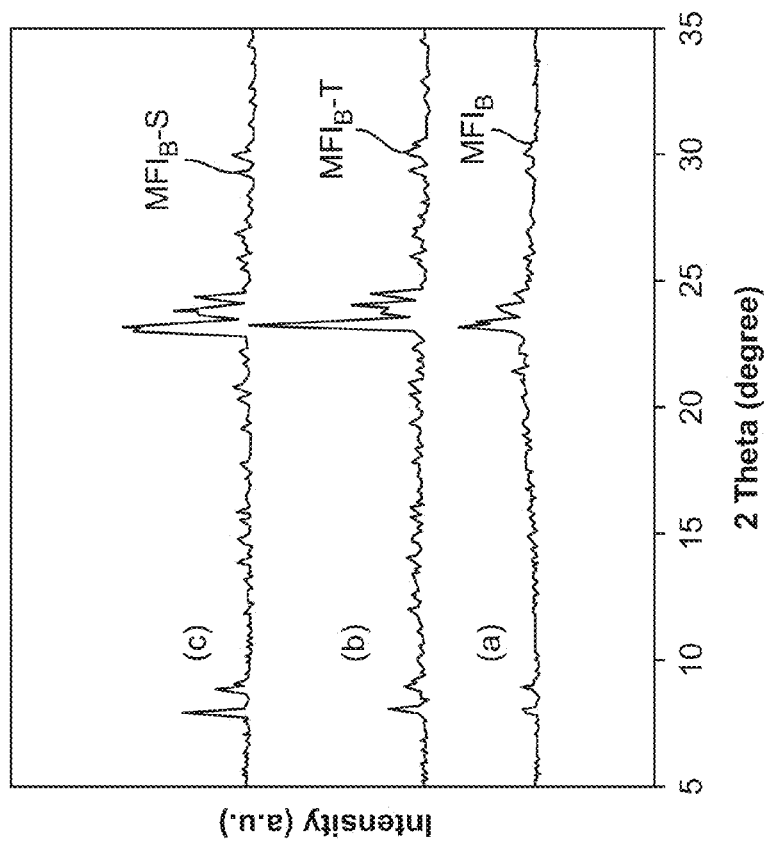
FIG. 1A shows X-ray diffraction patterns of the products synthesized from BEA (Si/Al=37.5) via (a) direct, (b) template-assisted (using TPABr), and (c) seed-assisted transformations (using MFI seeds). Syntheses were carried out at 423 K, $NaOH/SiO_2$=0.35 (from BEA) and $H_2O/SiO_2$=65 (from BEA). See also Table 1.
Figure 2B:
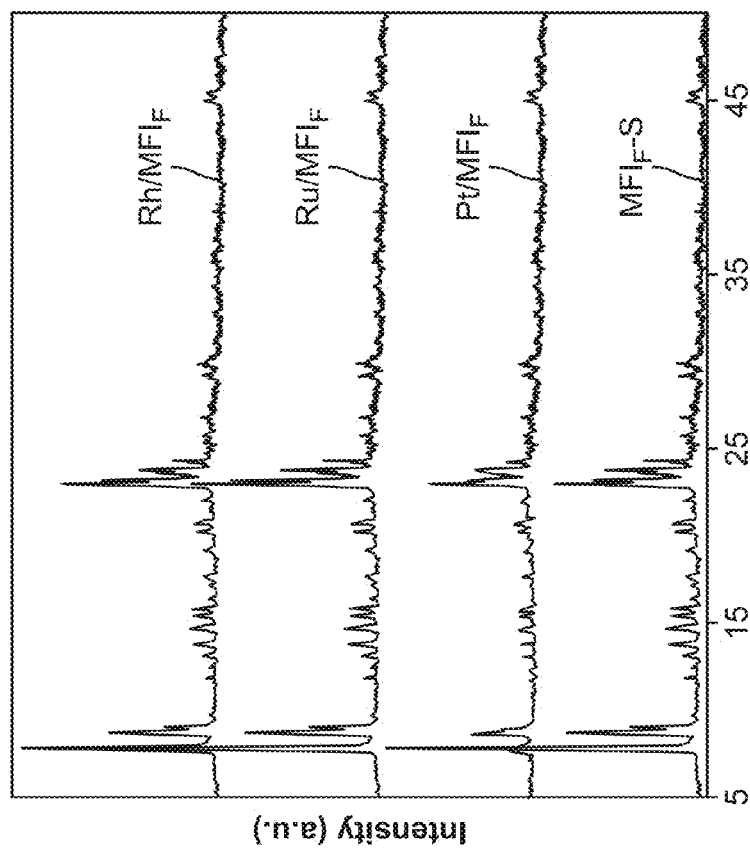
FIG. 2B shows X-ray diffraction patterns of MFI products synthesized by interzeolite transformations of FAU containing metal clusters as parent zeolites. Syntheses were carried out at molar composition $0.50NaOH:1.0SiO_2:0.0125Al_2O_3:95.0H_2O$ from FAU with 10% wt. MFI seeds at 423 K. See also Table 1.
Figure 2A:
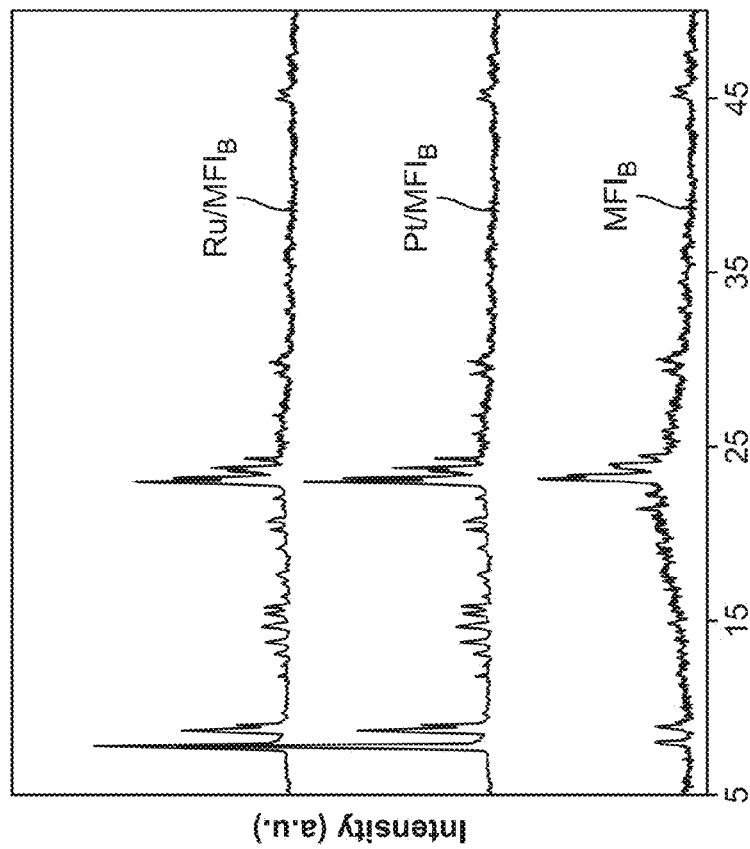
FIG. 2A shows X-ray diffraction patterns of MFI products synthesized by interzeolite transformations of BEA. Syntheses were carried out at molar composition 0.35 NaOH: $1.0SiO_2$:$0.0133Al_2O_3$:$65.0H_2O$ from BEA without seeds at 423 K. See also Table 1.

BEA and FAU zeolites were successfully transformed into MFI with or without encapsulated clusters in the parent zeolites (X-ray diffractograms; without metals, FIGS. 1A and 1B; with metals, FIGS. 2A and 2B. Subsequent treatments in flowing air at 673 K for 3 h and then in flowing H$_2$ at 623 K for 2 h did not cause detectable changes in MFI crystallinity. X-Ray diffractograms also did not show any lines for metal or oxide phases in M/MFI (M=Pt, Rh, Ru; FIGS. 2A and 2B) after H$_2$ treatment at 623 K for 2 h (0.64-1.23% wt. metal; Table 2), consistent with the absence of large metal crystallites in MFI daughter structures.

Figure 4A:
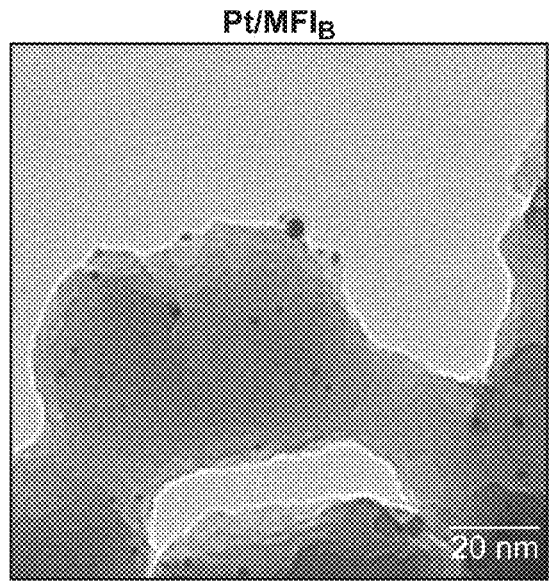
FIG. 4A shows TEM images and FIG. 4B shows metal cluster size distributions of Pt containing MFI samples synthesized by interzeolite transformations of BEA.
Figure 4B:
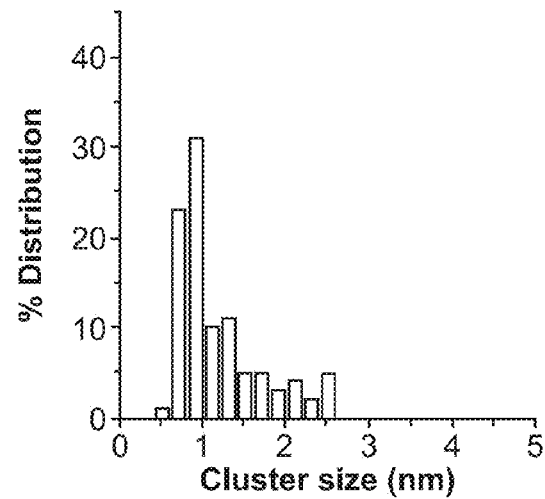
Figure 4C:
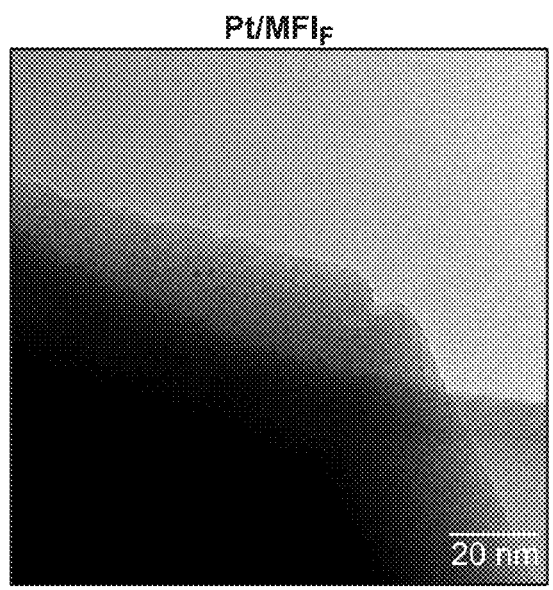
FIG. 4C shows TEM images and FIG. 4D shows metal cluster size distributions of Pt containing MFI samples synthesized by interzeolite transformations of FAU zeolites containing Pt clusters as parent materials.
Figure 4D:
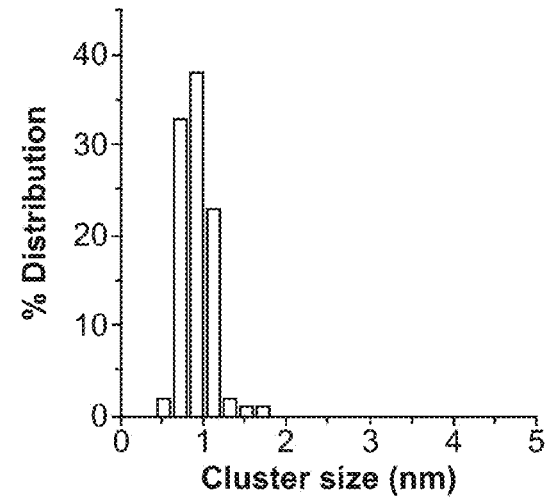
Figures 5A, 5B, 5C:
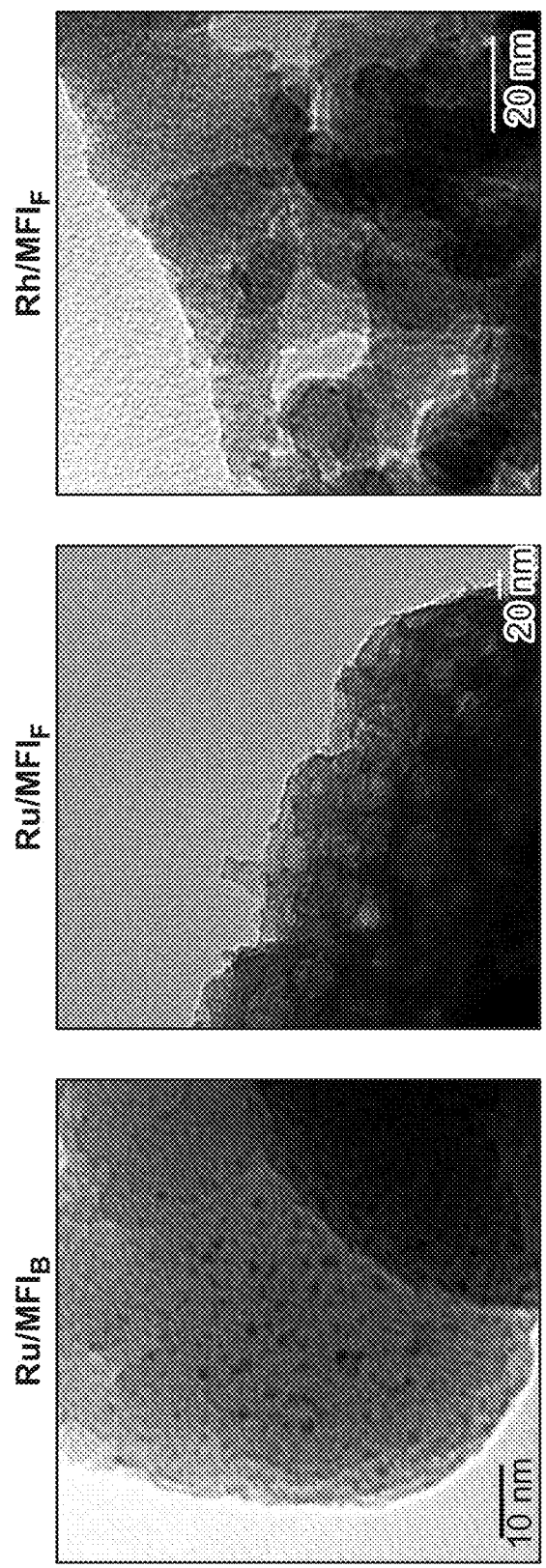
FIG. 5A shows TEM images of Ru containing MFI synthesized by interzeolite transformation of Ru/BEA.
FIG. 5B shows TEM images of Ru containing MFI synthesized by interzeolite transformations of Ru containing FAU as parent zeolites.
FIG. 5C shows TEM images of Rh containing MFI synthesized by interzeolite transformations of Rh containing FAU as parent zeolites.
Figure 6A:
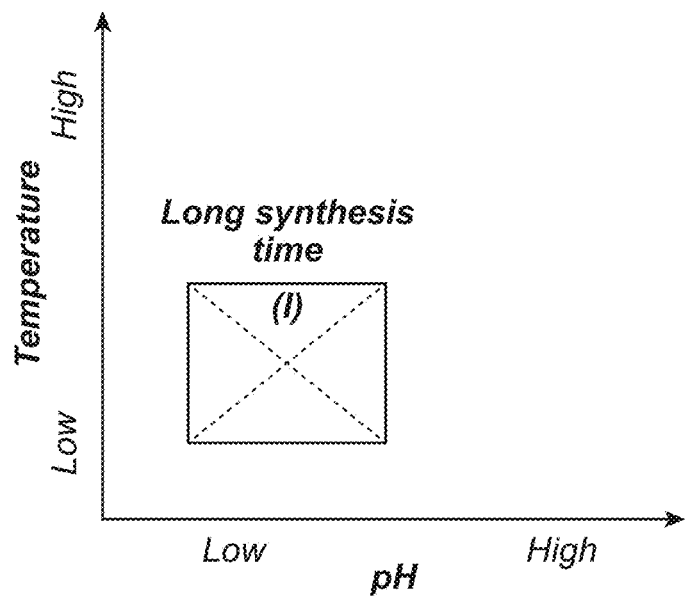
FIGS. 6A-6D show schematic representations of the synthesis factors that limit encapsulation of metal clusters within MFI over a broad range of synthesis conditions. Mi represents the synthesis method used (see Table 5).
Figure 6B:
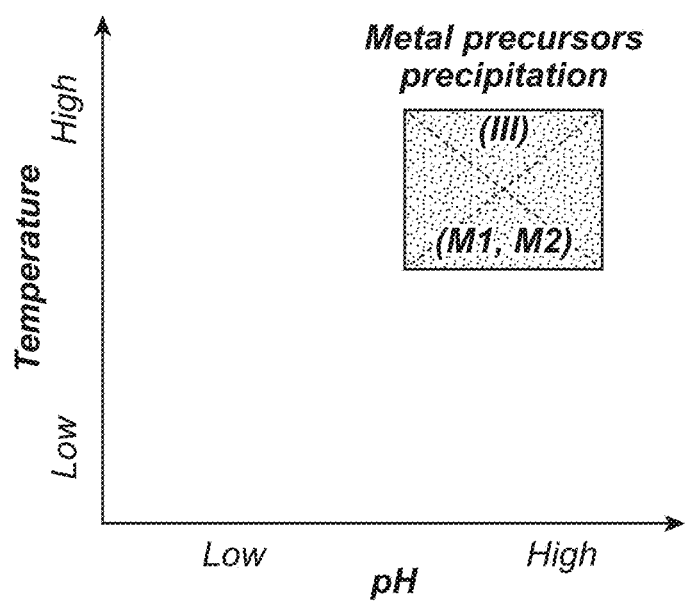
Figure 6C:
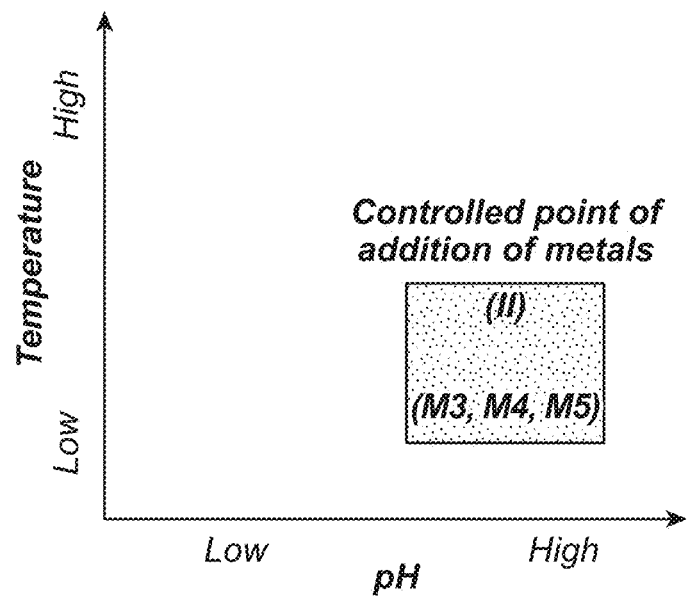
Figure 6D:
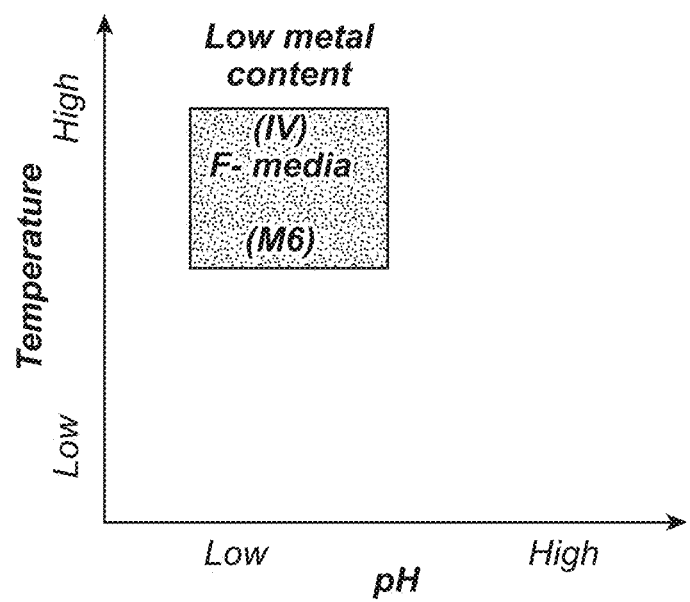

TEM images of reduced and passivated M/MFI samples (M=Pt, Ru, Rh) detected small clusters uniform in size (Pt/MFI$_B$ in FIGS. 4A and 4B and Pt/MFI$_F$ in FIGS. 4C and 4D, Ru/MFI$_B$ in FIG. 5A, Ru/MFI$_F$ in FIG. 5B, and Rh/MFI$_F$ in FIG. 5C). The surface-averaged mean cluster diameters and DI values obtained from TEM measurements (Table 2) were 1.7 nm and 1.41 for Pt/MFI$_B$ (vs. 1.6 nm and 1.07 in parent Pt/BEA) and 1.0 nm and 1.09 for Pt/MFI$_F$ (vs. 1.7 nm and 1.03 in parent Pt/FAU). The DI values of parent zeolites were slightly larger than the corresponding product zeolites, suggested that significant sintering or coalescence did not occur during interzeolite transformations. H$_2$ chemisorption measurements on Pt/MFI gave an average cluster diameter of 1.4 when it was prepared from Pt/BEA (d$_{chem}$=1.3) and 1.5 when derived from Pt/FAU (d$_{chem}$=1.1). These chemisorption-derived mean cluster diameters agree well with surface-averaged cluster diameters from TEM (0.8-1.6; Table 2), suggesting the absence of residues deposited from synthesis mixtures and not removed during post-synthesis treatments. In contrast, Pt/SiO$_2$ showed a d$_{TEM}$ value of 2.4 nm, a d$_{chem}$ value of 1.8 nm and a DI value of 1.96; these sizes and dispersities are significantly larger than for the clusters dispersed on parent (Pt/BEA and Pt/FAU) and product (Pt/MFI) zeolite samples, suggesting that confining environments are essential for the synthesis of small and uniform metal clusters.

Similarly, DI values (1.09-1.16 vs 1.08-1.16 for parent samples; Table 2), TEM-derived surface-averaged cluster diameters (1.3-1.5 vs 1.4-1.5 for parent samples); Table 2) and chemisorption-derived mean cluster diameters (1.2-1.5 vs 1.1-1.2 for parent samples; Table 2) for Ru/MFI$_B$, Ru/MFI$_F$, and Rh/MFI$_F$ were also consistent with the presence of small, uniform and clean metal clusters within MFI voids and with the retention of encapsulation during transformations from parent BEA or FAU materials.

EXAMPLE 7

Hydrogenation rates of toluene and 1,3,5-TMB (0.59 nm and 0.74 nm kinetic diameters) were used to assess the extent of confinement of Pt, Ru, and Rh clusters within MFI products zeolites (~0.55 nm apertures). Toluene (but not 1,3,5-TMB) can access active sites encapsulated within MFI voids via diffusion through their interconnected voids and apertures.

1,3,5-TMB hydrogenation reaction led to the exclusive formation of (cis- and trans-) 1,3,5-trimethyl cyclohexane on all catalysts. Table 4 shows turnover rates for the hydrogenation of these arenes on metal clusters (M=Pt, Ru, Rh) clusters dispersed on SiO$_2$ (M/SiO$_2$) and MFI (M/MFI$_B$ and M/MFI$_F$). Toluene hydrogenation turnover rates were somewhat lower on Pt/MFI$_B$ and Pt/MFI$_F$ than on Pt/SiO$_2$ samples (by factors of 1.2 and 2.7, respectively, Table 4), possibly because access to metal clusters was restricted by diffusion through the MFI apertures (~0.55 nm), which are similar to the size of toluene (0.59 nm kinetic diameter [4]) or due to the partial blockage of the pore entrances by the amorphous solids, present in small amount in these materials. In contrast, 1,3,5-TMB turnover rates were much smaller on Pt/MFI$_B$ and Pt/MFI$_F$ than on Pt/SiO$_2$ samples (by factors of 10 and 50, respectively, Table 4), suggesting that most of the active surfaces reside within MFI voids inaccessible to 1,3,5 TMB. Pt/MFI$_B$ and Pt/MFI$_F$, synthesized via interzeolite transformations of Pt/BEA and Pt/FAU, respectively, gave much higher $\chi$ values (22.4 and 50.0 for Pt/MFI$_B$ and Pt/MFI$_F$, respectively) for selective hydrogenation of toluene and 1,3,5-TMB than for the Pt clusters dispersed on SiO$_2$ ($\chi_{SiO2}$=2.7; Table 4); these values lead, in turn, to high encapsulation selectivities ($\varphi$=8.3 and 18.5, respectively; Table 4), consistent with the preferential encapsulation of Pt clusters within MFI voids. The encapsulation selectivity value was 8.3 for Pt/MFI$_B$ (vs. 40.9 for Pt/BEA) and 18.5 for Pt/MFI$_F$ (vs. 36.4 for Pt/FAU); these encapsulation selectivities for product zeolites are lower than the values of their respective parent zeolite suggesting most of the clusters remained within zeolitic pores during transformations; consistent with slight increase in DI values from parent to product zeolites. Ru/MFI$_B$, Ru/MFI$_F$ and Rh/MFI$_F$ synthesized also gave much larger $\chi$ values (150, 60 and 17, respectively; Table 4) than for the respective metals dispersed on $SiO_2$ (6.6 and 2.1 for Ru and Rh, respectively; Table 4) and consequently, high encapsulation selectivities for hydrogenation reactions (22.7, 9.1 and 8.1, respectively (vs. 14.3, 15.4, yy for their corresponding parent zeolite); Table 4), indicating that Ru and Rh clusters on these zeolitic samples indeed reside predominantly within locations accessible only to the smaller toluene reactant and that the encapsulation of these clusters within zeolitic voids was preserved during interzeolite transformations.

TABLE 4

Catalytic properties of metal containing MFI and $SiO_2$ samples in hydrogenation of arenes.[a]

| Sample | $r_{toluene}^b$ (mol $(mol_{surf-metal}^{-1}s^{-1})$) | $r_{1,3,5\text{-}TMB}^b$ (mol $(mol_{surf-metal}^{-1}s^{-1})$) | $\chi_j^c$ j = MFI, $SiO_2$ | $\phi^d$ |
|---|---|---|---|---|
| Pt/MFI$_B$ | 1.12 | 0.05 | 22.4 | 8.3 |
| Pt/MFI$_F$ | 0.50 | 0.01 | 50.0 | 18.5 |
| Pt/SiO$_2$ | 1.35 | 0.50 | 2.7 | 1.0 |
| Ru/MFI$_B$ | 0.015 | 0.0001 | 150.0 | 22.7 |
| Ru/MFI$_F$ | 0.012 | 0.0002 | 60.0 | 9.1 |
| Ru/SiO$_2$ | 0.173 | 0.0260 | 6.6 | 1.0 |
| Rh/MFI$_F$ | 0.017 | 0.001 | 17.0 | 8.1 |
| Rh/SiO$_2$ | 0.023 | 0.011 | 2.1 | 1.0 |

[a]Hydrogenations were carried out with 0.35 kPa toluene/0.26 kPa 1,3,5-TMB and 100 kPa $H_2$ at 473 K.
[b]Reaction turnover rate is defined as mole of reactant converted per mol of surface metal atoms per second.
[c]$\chi_j = r_{toluene}/r_{1,3,5\text{-}TMB}$, j = MFI, $SiO_2$.
[d]$\phi = \chi_{MFI}/\chi_{SiO2}$.

The high encapsulation selectivity values (8-23; Table 4) for M/MFI samples also indicate that for all these samples more than 88% of the metal surface areas are contained within locations accessible to toluene but not to 1,3,5-TMB. These data, taken together with the TEM- and chemisorption-derived mean cluster diameters and size uniformity, suggest that most of the metal clusters initially present within BEA or FAU voids remained inside the zeolitic pores during the transformations, retaining encapsulation in the resulting MFI samples, that can select reactant based on molecular size and allow access to active sites only by the reactants smaller than the MFI aperture sizes.

EXAMPLE 8

The successful synthesis of encapsulated clusters first requires that successful MFI nucleation and growth from basic media occur before insoluble colloidal hydroxides form via reactions of metal precursors with OH$^-$ species at the high pH required. We seek here synthesis conditions that promote nucleation and growth, while inhibiting the premature precipitation of metal precursors. A schematic depiction of how synthesis strategies and conditions may accomplish such objectives is shown in FIGS. 6A-6D. In what follows, we examine these synthesis parameters according to the regions depicted in FIGS. 6A-6D (e.g., whether OH$^-$ or F$^-$ are used as the mineralizing agents) with the objective of controlling the relative rates of zeolite nucleation and precursor precipitation. Additional details of these synthesis conditions used are given in Table 5, together with the encapsulation selectivity values of the catalytic materials formed. The encapsulation selectivity for these metal-zeolite materials are reported from the rates of hydrogenation of toluene and 1,3,5-TMB, as done for the materials prepared by interzeolite transformations of BEA or FAU into MFI.

In region III (FIG. 6B), the synthesis was carried out at high pH and temperature (pH 12, 433 K), which favor fast nucleation and crystallization of MFI, but also the rapid formation of insoluble hydroxides from the metal precursors. The encapsulation selectivity parameter for the products formed at these conditions was near unity, suggesting the prevalence of extrazeolitic clusters. The use of SDA moieties (tetrapropylammonium bromide) also promotes rapid and selective MFI crystallization, but such species can fill the intracrystalline voids, thus preventing the encapsulation of the metal precursors, even as solvated monomers. The selectivity parameter for the product in this case was, again, near unity (0.85 for Pt using Pt(NH$_3$)$_4$(NO$_3$)$_2$ precursor indicating that the clusters formed do not reside during intracrystalline MFI voids. As a result, the use of SDA species must be avoided (or their concentration kept very low) during synthesis, while also maintaining conditions that disfavor the formation of colloidal hydroxides of metal precursors. Using the minimal amount of SDA required to fill the intracrystalline voids, while keeping low temperatures (383 K) but high OH$^-$ levels (pH 12.9), did not lead to crystallization of MFI structures (M4, Table 5) and the amorphous structures formed did not provide any access constraints.

Lower temperatures and OH$^-$ concentrations were considered. At the low temperature and pH of region I (403-523 K, 7-11, FIG. 6A), metal precursors are stable but so are the silicate species that assemble into MFI frameworks, causing synthesis times, in this case, to be very long, in some reported cases on the order of several months.

While encapsulation can be achieved via direct hydrothermal synthesis protocols by introducing metal precursors later in the zeolite synthesis or by decreasing the pH using F$^-$ instead of OH$^-$ as mineralizing agents, these methods lead to modest encapsulation selectivities using delayed precursor addition and to low encapsulation yields using fluoride synthesis. Interzeolite transformation protocols, consistent with the present method, however, circumvent the encapsulation challenges in direct hydrothermal syntheses and, in doing so, provide a general method for the encapsulation of metal clusters within the voids of MFI crystals with high selectivities and metal contents. Such protocols merely require that such cations be able to exchange into a parent zeolite with voids larger than MFI or other daughter zeolite. The parent zeolite exhibits a lower framework density (here BEA or FAU), which is subsequently converted into a daughter zeolite (here MFI), for which exchange or more direct methods of encapsulation are not feasible. It seems reasonable to infer that such interzeolite transformation approaches for the containment of metal clusters can be generally extended to any metals with cationic complexes in aqueous media and to any interconversions that increase zeolite framework density, whether they occur spontaneously or through the use of kinetics aids (e.g. seeds or organic structure-directing agents) under hydrothermal conditions.

Based on Examples 1-8 above, it can be concluded that successful encapsulation of metal clusters (Pt, Ru, Rh)

within MFI voids was achieved via interzeolite transformations of metal containing BEA or FAU zeolites, by low temperature hydrothermal synthesis with controlled point of addition of metal precursors, and direct hydrothermal synthesis in fluoride media. Interzeolite transformations provide an opportunity to synthesize zeolites with less-time, cost and represents a more economic and environmentally conscious approach, compared to direct hydrothermal synthesis methods, and do so by assisting the nucleation of the desired product zeolite and avoiding the use of organic structure directing agents during synthesis. These interzeolite transformation methods also led to the successful encapsulation of metal clusters within MFI zeolites, where encapsulation was not otherwise feasible by developed protocols involving direct hydrothermal synthesis with ligand-stabilized metal precursors and post synthesis exchange. X-ray diffraction, electron microscopy, and $H_2$ chemisorption measurements, when combined, confirmed the transformation of parent zeolites to MFI and the presence of small, uniform and clean metal clusters. The relative rates of hydrogenation of toluene and 1,3,5-TMB on metal clusters dispersed on MFI and $SiO_2$ showed that the metal clusters in the zeolitic samples reside predominately within MFI voids, where they were accessible only to the smaller toluene reactant. We expect that the developed interzeolite transformation approach for the synthesis of MFI with/without encapsulated metal clusters can be extended further to zeolites of different frameworks, void environments and framework compositions and to encapsulate clusters of other metals, metal oxides and metal sulfides of catalytic importance.

Aldrich) and $[Cu(NH_3)_4]SO_4H_2O$ (98%, Sigma Aldrich) were used as received. In the present examples, the material used as seeds were prepared using previously described synthesis procedures for CHA (chabazite)[1], STF (SSZ-35)[2] and MTW (ZSM-12)[3] zeolites.

(1) Zones, S. I. U.S. Pat. No. 8,007,763 B2, Aug. 30, 2011; (2) Musilova-Pavlackova, S.; Zones, S. I.; Cejka, J. Top. Catal. 2010, 53, 273; (3) Jones, A. J.; Zones, S. I.; Iglesia, E. J. Phys. Chem. C 2014, 118.17787.

EXAMPLE 9

The synthesis of CHA, STF, and MTW zeolites was achieved by interzeolite transformations of FAU as parent zeolite. FAU (0.5-1.0 g) was added to an aqueous NaOH solution to achieve molar compositions of x $NaOH:1.0SiO_2$; $95H_2O$ (x=0.50, 0.68, 0.85), into which 10% wt. (% wt. based on parent FAU) seed crystals (CHA, STF, or MTW) were added to prepare final mixtures with molar compositions listed in Table 6 below. These mixtures were placed within sealed polypropylene containers (Nalgene, 125 $cm^3$) and homogenized by vigorous magnetic stirring (400 rpm; IKA RCT Basic) for 1 hour at ambient temperature. These mixtures were then transferred into a Teflon-lined stainless steel autoclave and held at the desired crystallization temperature (423, 428, or 433 K) for 40 hours under static conditions. The resulting solids were collected by filtration through a fritted disc Buchner filter funnel (Chemglass, 150 ml, F) and washed with deionized water (17.9 MΩ resistivity) until the rinse liquids reached a pH of 7-8. The samples were treated in a convection oven at 373 K overnight. The samples were then heated in tube furnace is flowing dry air

TABLE 5

Synthesis procedures and encapsulation selectivities for metal-containing MFI synthesized by direct hydrothermal syntheses.

| Name | Sample | Composition | Metal precursor (composition)[a] | T (K) | $t^b$ (d) | Preparation method | $\Phi^c$ | Comments |
|---|---|---|---|---|---|---|---|---|
| M1 | Ru/MFI | 70 $SiO_2$:1.0 $Al_2O_3$:11.5 $Na_2O$:2800 $H_2O$ | $RuCl_3$ (1.9) | 433 | 3 | Direct hydrothermal synthesis with added RuCl3 | 0.95 | Metal precursor decomposed in the synthesis |
| M2 | Pt/MFI | 70 $SiO_2$:1.0 $Al_2O_3$:11.5 $Na_2O$:2800 $H_2O$ | $Pt(NH_3)_4(NO_3)_2$ (3.5) | 433 | 3 | Direct hydrothermal synthesis with ligand-stabilized metal precursor | 0.98 | Metal precursor decomposed in the synthesis |
| M3 | Pt/MFI | 0.04 TPABr:0.003 $Al_2O_3$:1 $SiO_2$:120 $H_2O$:0.322 $OH^-$ | $Pt(NH_3)_4(NO_3)_2$ (0.05) | 383 | 12 | Low T synthesis with excess amount of template | 0.85 | Competition between metal precursor and SDA |
| M4 | Pt/MFI | 0.02 TPABr:0.003 $Al_2O_3$:1 $SiO_2$:120 $H_2O$:0.322 $OH^-$ | $Pt(NH_3)_4(NO_3)_2$ (0.05) | 383 | 15 | Low T synthesis with sub-stoichiometric amount of template | 0.90 | Poor crystallization of resulted MFI, metal precursor precipitation |
| M5 | Pt/MFI | 0.03 TPABr:0.003 $Al_2O_3$:1 $SiO_2$:120 $H_2O$:0.322 $OH^-$ | $Pt(NH_3)_4(NO_3)_2$ (0.05) | 383 | 15 | Metal precursor added after 5 days of synthesis | 5 | Successful Encapsulation |
| M6 | Pt/MFI | 0.07 TPABr:1.0 TEOS:0.012 $NaAlO_2$:1.2 $NH_4F$:80 $H_2O$ | $Pt(NH_3)_4(NO_3)_2$ (0.05) | 443 | 7 | High T, low pH synthesis in fluoride media | 12 | Successful encapsulation, low metal loading |

[a]Metal precursor molar compositions are reported relative to $SiO_2$.
[b]t = time required for synthesis in days.
[c]$\phi = \chi_{zeolite}/\chi_{SiO2}$, $\chi_j = r_{toluene}/r_{1, 3, 5\text{-}TMB}$, j = MFI, $SiO_2$.

EXAMPLES 9-12

In Examples 9-12, the following materials were used:

NaOH (99.994%, Sigma Aldrich), FAU (CBV780, Zeolyst, H-FAU, Si/Al=40), $Cu(acac)_2$ (>99.99%, Sigma (1.67 $cm^3$ $g^{-1}$ $s^{-1}$) to 873 K at 0.03 K $s^{-1}$ and held at this temperature for 3 hours. The resulting samples after treatment were denoted as $CHA_F$, $STF_F$, $MTW_F$, synthesized via interzeolite transformations of FAU using seeds of CHA, STF (SSZ-35), and MTW (ZSM-12), respectively.

TABLE 6

Initial synthesis molar compositions [a,b] for transformations of FAU using CHA, STF and MTW seeds

| Sample Name | Parent zeoite (Si/Al) | NaOH/ $SiO_2$ [b] | Temp (K.) | Seeds [b,c] | Product zeolite [d] | Final Synthesis pH | Yield [e] (%) |
|---|---|---|---|---|---|---|---|
| $CHA_F$-1 | FAU(40) | 0.50 | 423 | 10% wt. CHA Seeds | CHA + Am. | 11.77 | 51.0 |
| $CHA_F$-2 | FAU(40) | 0.68 | 423 | 10% wt. CHA Seeds | CHA | 11.72 | 27.2 |
| $CHA_F$-3 | FAU(40) | 0.85 | 423 | 10% wt. CHA Seeds | CHA + MOR | 12.20 | 24.2 |
| $CHA_F$-4 | FAU(40) | 0.50 | 428 | 10% wt. CHA Seeds | CHA + Am. | 11.87 | 54.4 |
| $STF_F$-1 | FAU(40) | 0.50 | 423 | 10% wt. STF Seeds | STF + Am. | 11.83 | 52.1 |
| $STF_F$-2 | FAU(40) | 0.50 | 428 | 10% wt. STF Seeds | STF + Am. | 11.80 | 53.4 |
| $STF_F$-3 | FAU(40) | 0.50 | 433 | 10% wt. STF Seeds | STF + MFI | 12.05 | 57.3 |
| $STF_F$-4 | FAU(40) | 0.68 | 423 | 10% wt. STF Seeds | STF + Am. | 11.68 | 28.7 |
| $STF_F$-5 | FAU(40) | 0.85 | 423 | 10% wt. STF Seeds | STF + MOR | 12.05 | 36.0 |
| $MTW_F$-1 | FAU(40) | 0.50 | 423 | 10% wt. MTW Seeds | MTW + Am. | 11.86 | 48.0 |
| $MTW_F$-2 | FAU(40) | 0.50 | 428 | 10% wt. MTW Seeds | MTW + Am. | 11.85 | 53.0 |
| $MTW_F$-3 | FAU(40) | 0.68 | 423 | 10% wt. MTW Seeds | MTW + Am. | 12.00 | 31.6 |

[a] $H_2O/SiO_2$ = 95 and synthesis time = 40 h for all the syntheses.
[b] Initial synthesis molar composition excludes the $SiO_2$ amount of seed material
[c] Seed (wt. %) = $\frac{\text{seed material (g)}}{\text{Parent zeolite (g)}} \times 100$
[d] Am. = Amorphous
[e] yield (%) = $\frac{\text{Product (g)}}{\text{Parent zeolite (g)}} \times 100$

EXAMPLE 10

Cu precursor encapsulated within FAU was prepared by ion exchange from an aqueous solution of $Cu(acac)_2$ (10:1 mass ratio of $H_2O$; zeolite, to achieve ~1% wt. Cu content) at 353 K by magnetic stirring (400 rpm; IKA RCT Basic) for 24 hours. The solid obtained was collected by filtration through a fitted disc Buchner filter funnel (Chemglass, 150 ml, F) and washed with deionized water (17.9 MΩ resistivity) until the rinse liquids reached a pH of 7-8. The sample was then treated in a convection oven at 373 K overnight, and the resulting sample was denoted as Cu/FAU.

EXAMPLE 11

The encapsulation of Cu within CHA was achieved by interzeolite transformations of Cu/FAU (0.5-1.0 g) was added to an aqueous NaOH solution (molar composition 0.68 NaOH:1.0$SiO_2$:95 $H_2O$) along with 10% wt. CHA seeds (% wt. based on parent FAU) to prepare the synthesis mixture. The mixture was placed within sealed polypropylene container (Nalgene, 125 cm³) and homogenized by vigorous magnetic stirring (400 rpm; IKA RCT Basic) for 1 hour at ambient temperature. The mixture was then transferred into a Teflon-lined stainless steel autoclave and held at 423 K under static conditions for 40 hours. The resulting solid was collected by filtration through a fritted disc Buchner filter funnel (Chemglass, 150 ml, F) and washed with deionized water (17.9 MΩ resistivity) until the rinse liquids reached a pH of 7-8. The sample was then treated in a convection oven at 373 K overnight, and the resulting sample was denoted as Cu/$CHA_{CuF}$, synthesized via interzeolite transformations of Cu/FAU.

EXAMPLE 12

The encapsulation of Cu within CHA was achieved by interzeolite transformations of FAU as parent material with added Cu precursor in the synthesis gel. FAU (0.5-1.0 g) was added to an aqueous NaOH solution (molar composition 0.68 NaOH:1.0$SiO_2$: 95 $H_2O$) along with 10% wt. CHA seeds (% wt. based on parent FAU) and $[Cu(NH_3)_4]SO_4H_2O$ (~2% wt. Cu content based on FAU) to prepare the final synthesis mixture. The mixture was placed within sealed polypropylene containers (Nalgene, 125 cm³) and homogenized by vigorous magnetic stirring (400 rpm; IKA RCT Basic) for 1 hour at ambient temperature. The mixture was then transferred into a Teflon-lined stainless steel autoclave and held at 423 K under static conditions for 40 hours. The resulting solid was collected by filtration through a fitted disc Buchner filter funnel (Chemglass, 150 ml, F) and washed with deionized water (17.9 MΩ resistivity) until the rinse liquids reached a pH of 7-8. The sample was then treated in a convection oven at 373 K overnight. The resulting sample was denoted as Cu/$CHA_F$, synthesized via interzeolite transformations of FAU.

The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. Encapsulating a metal in a zeolite by the method of:
   (a) inserting a metal or metal precursor into a parent zeolite, and
   (b) converting the parent zeolite to a zeolite having a higher framework density than the parent zeolite, in the absence of a structure directing agent (SDA), wherein the conversion is conducted in a basic solution having a NaOH/$SiO_2$ ratio in the range of from 0.25 to 1.0 and a $H_2O/SiO_2$ ratio greater than 50, and at a temperature above the crystallization temperature of the parent zeolite.
2. The method of claim 1, wherein seed crystals of the higher framework density zeolite are added to the parent zeolite prior to or during the conversion.
3. The method of claim 1, wherein the conversion is achieved by hydrothermal synthesis.
4. The method of claim 1, wherein the conversion is achieved in a basic solution.

5. The method of claim 1, wherein the metal has dimensions such that it cannot be ion-exchanged or impregnated directly into the higher framework density zeolite.

6. The method of claim 5, wherein the metal is Pt, Rh, Ru or Cu.

7. The method of claim 1, wherein the parent zeolite is BEA or FAU.

8. The method of claim 1, wherein the parent zeolite is a Y zeolite.

9. The method of claim 1, wherein the higher framework density zeolite is ZSM-5, SSZ-35, ZSM-12 or chabazite.

10. The method of claim 1, wherein the parent zeolite is BEA or FAU, the higher framework density zeolite is ZSM-5, and the metal is Pt, Rh or Ru.

11. The method of claim 1, wherein the parent zeolite comprises a Y zeolite, the higher framework zeolite is a chabazite, and the metal is Cu.

12. The method of claim 1, wherein the higher framework density zeolite has a silica/alumina ratio of 10 or greater.

13. The method of claim 12, wherein the silica/alumina ratio is 25 or greater.

14. The method of claim 1, wherein the metal precursor comprises an amine complex.

15. The method of claim 1, wherein the metal precursor is a ligated metal.

16. The method of claim 1, wherein the metal comprises a metal cluster.

17. The method of claim 1, wherein the insertion is achieved by exchanging cationic metal precursors and reducing the metal precursors with $H_2$ to form metal clusters.

* * * * *